United States Patent
Brown

(10) Patent No.: US 12,359,501 B2
(45) Date of Patent: Jul. 15, 2025

(54) CONNECTORS FOR SMART WINDOWS

(71) Applicant: View, Inc., Milpitas, CA (US)

(72) Inventor: Stephen Clark Brown, San Mateo, CA (US)

(73) Assignee: View Operating Corporation, San Jose, CA (US)

( * ) Notice: Subject to any disclaimer, the term of this patent is extended or adjusted under 35 U.S.C. 154(b) by 0 days.

(21) Appl. No.: 17/808,228

(22) Filed: Jun. 22, 2022

(65) Prior Publication Data

US 2022/0316270 A1 Oct. 6, 2022

Related U.S. Application Data

(63) Continuation of application No. 16/777,758, filed on Jan. 30, 2020, now Pat. No. 11,408,223, which is a
(Continued)

(51) Int. Cl.
*G02F 1/153* (2006.01)
*E06B 3/66* (2006.01)
(Continued)

(52) U.S. Cl.
CPC ............... *E06B 9/24* (2013.01); *E06B 3/66* (2013.01); *E06B 3/6612* (2013.01);
(Continued)

(58) Field of Classification Search
CPC ........ G02F 1/153; G02F 1/1533; G02F 1/155; G02F 1/161; H01R 13/73; H01R 25/14;
(Continued)

(56) References Cited

U.S. PATENT DOCUMENTS 253,392 A 2/1882 Jones et al.
2,121,753 A 6/1938 Cornell, Jr. et al.
(Continued)

FOREIGN PATENT DOCUMENTS

CN 1380991 A 11/2002
CN 1822951 A 8/2006
(Continued)

OTHER PUBLICATIONS

Armstrong, Dave, "Smart, energetic glass could take over" in Earth Times, [http://www.earthtimes.org/energy/smart-energetic-glass-take-over/2866/] Apr. 12, 2015.
(Continued)

*Primary Examiner* — Joseph P Martinez
(74) *Attorney, Agent, or Firm* — Cha & Reiter, LLC

(57) ABSTRACT

This disclosure provides connectors for smart windows. A smart window may incorporate an optically switchable pane. In one aspect, a window unit includes an insulated glass unit including an optically switchable pane. A wire assembly may be attached to the edge of the insulated glass unit and may include wires in electrical communication with electrodes of the optically switchable pane. A floating connector may be attached to a distal end of the wire assembly. The floating connector may include a flange and a nose, with two holes in the flange for affixing the floating connector to a first frame. The nose may include a terminal face that present two exposed contacts of opposite polarity.

19 Claims, 16 Drawing Sheets

Related U.S. Application Data continuation of application No. 16/163,445, filed on Oct. 17, 2018, now Pat. No. 10,591,799, which is a continuation of application No. 15/597,041, filed on May 16, 2017, now Pat. No. 10,139,697, which is a continuation of application No. 15/217,873, filed on Jul. 22, 2016, now Pat. No. 9,690,162, which is a continuation of application No. 14/591,851, filed on Jan. 7, 2015, now Pat. No. 9,436,054, which is a continuation of application No. 14/325,290, filed on Jul. 7, 2014, now Pat. No. 9,019,588, which is a continuation of application No. 14/103,660, filed on Dec. 11, 2013, now Pat. No. 8,810,889, which is a continuation of application No. 13/326,168, filed on Dec. 14, 2011, now Pat. No. 8,643,933.

(51) Int. Cl.

| | | |
|---|---|---|
| *E06B 3/663* | (2006.01) | |
| *E06B 3/667* | (2006.01) | |
| *E06B 3/67* | (2006.01) | |
| *E06B 3/673* | (2006.01) | |
| *E06B 7/00* | (2006.01) | |
| *E06B 7/28* | (2006.01) | |
| *E06B 9/00* | (2006.01) | |
| *E06B 9/24* | (2006.01) | |
| *G02F 1/1345* | (2006.01) | |
| *G02F 1/1523* | (2019.01) | |
| *G02F 1/161* | (2006.01) | |
| *G02F 1/163* | (2006.01) | |
| *H01R 4/12* | (2006.01) | |
| *H01R 12/79* | (2011.01) | |
| *H01R 13/62* | (2006.01) | |
| *H01R 13/631* | (2006.01) | |
| *H01R 13/73* | (2006.01) | |
| *H01R 24/76* | (2011.01) | |
| *H01R 25/14* | (2006.01) | |
| *H01R 25/16* | (2006.01) | |
| *H01R 41/00* | (2006.01) | |
| *H01R 103/00* | (2006.01) | |

(52) U.S. Cl.
CPC ........ *E06B 3/6621* (2013.01); *E06B 3/66304* (2013.01); *E06B 3/66309* (2013.01); *E06B 3/66328* (2013.01); *E06B 3/667* (2013.01); *E06B 3/6722* (2013.01); *E06B 3/673* (2013.01); *E06B 3/67326* (2013.01); *E06B 3/67391* (2013.01); *E06B 7/00* (2013.01); *E06B 7/28* (2013.01); *E06B 9/00* (2013.01); *G02F 1/1345* (2013.01); *G02F 1/1523* (2013.01); *G02F 1/153* (2013.01); *G02F 1/161* (2013.01); *G02F 1/163* (2013.01); *H01R 4/12* (2013.01); *H01R 12/79* (2013.01); *H01R 13/6205* (2013.01); *H01R 13/6315* (2013.01); *H01R 13/73* (2013.01); *H01R 24/76* (2013.01); *H01R 25/14* (2013.01); *H01R 25/162* (2013.01); *H01R 41/00* (2013.01); *E06B 2009/2417* (2013.01); *E06B 2009/2464* (2013.01); *H01R 2103/00* (2013.01); *Y10T 29/49117* (2015.01)

(58) Field of Classification Search
CPC ... E06B 7/00; E06B 3/667; E06B 7/28; E06B 3/66304; E06B 9/24; E06B 2009/2464
See application file for complete search history.

(56) References Cited

U.S. PATENT DOCUMENTS

| | | |
|---|---|---|
| 3,379,859 A | 4/1968 | Marriott |
| 3,876,862 A | 4/1975 | Newman et al. |
| 4,306,140 A | 12/1981 | Stromquist |
| 4,691,486 A | 9/1987 | Niekrasz et al. |
| 4,937,423 A | 6/1990 | Yoshihara et al. |
| 4,941,302 A | 7/1990 | Barry |
| 4,958,917 A | 9/1990 | Hashimoto et al. |
| 5,017,755 A | 5/1991 | Yahagi et al. |
| 5,097,358 A | 3/1992 | Ito et al. |
| 5,124,833 A | 6/1992 | Barton et al. |
| 5,170,108 A | 12/1992 | Peterson et al. |
| 5,313,761 A | 5/1994 | Leopold |
| 5,379,146 A | 1/1995 | Defendini |
| 5,384,653 A | 1/1995 | Benson et al. |
| 5,457,564 A | 10/1995 | Leventis et al. |
| 5,657,149 A | 8/1997 | Buffat et al. |
| 5,657,150 A | 8/1997 | Kallman et al. |
| 5,724,175 A | 3/1998 | Hichwa et al. |
| 5,822,107 A | 10/1998 | Lefrou et al. |
| 5,877,936 A | 3/1999 | Nishitani et al. |
| 5,948,195 A | 9/1999 | Thomas |
| 6,001,487 A | 12/1999 | Ladang et al. |
| 6,039,390 A | 3/2000 | Agrawal et al. |
| 6,045,896 A | 4/2000 | Boire et al. |
| 6,055,088 A | 4/2000 | Fix et al. |
| 6,068,720 A | 5/2000 | McHugh |
| 6,176,715 B1 | 1/2001 | Buescher |
| 6,204,953 B1 | 3/2001 | Zieba et al. |
| 6,261,641 B1 | 7/2001 | Zieba et al. |
| 6,275,157 B1 | 8/2001 | Mays et al. |
| 6,337,758 B1 | 1/2002 | Beteille et al. |
| 6,369,935 B1 | 4/2002 | Cardinal et al. |
| 6,407,847 B1 | 6/2002 | Poll et al. |
| 6,420,071 B1 | 7/2002 | Lee et al. |
| 6,529,308 B2 | 3/2003 | Beteille et al. |
| 6,559,411 B2 | 5/2003 | Borgeson et al. |
| 6,567,708 B1 | 5/2003 | Bechtel et al. |
| 6,795,226 B2 | 9/2004 | Agrawal et al. |
| 6,897,936 B1 | 5/2005 | Li et al. |
| 6,919,530 B2 | 7/2005 | Borgeson et al. |
| 6,950,221 B1 | 9/2005 | Terada et al. |
| 7,002,720 B2 | 2/2006 | Beteille et al. |
| 7,033,655 B2 | 4/2006 | Beteille et al. |
| 7,230,748 B2 | 6/2007 | Giron et al. |
| 7,259,730 B2 | 8/2007 | O'Keeffe |
| 7,362,491 B2 | 4/2008 | Busick et al. |
| 7,531,101 B2 | 5/2009 | Beteille |
| 7,586,664 B2 | 9/2009 | O'Shaughnessy |
| 7,710,671 B1 | 5/2010 | Kwak et al. |
| 7,869,114 B2 | 1/2011 | Valentin et al. |
| 7,894,119 B2 | 2/2011 | Valentin et al. |
| 7,929,194 B2 | 4/2011 | Legois et al. |
| 7,941,982 B2 | 5/2011 | Merica |
| 8,035,882 B2 | 10/2011 | Fanton et al. |
| 8,213,074 B1 | 7/2012 | Shrivastava et al. |
| 8,254,013 B2 | 8/2012 | Mehtani et al. |
| 8,643,933 B2 * | 2/2014 | Brown .............. H01R 13/6315 359/275 |
| 8,669,503 B2 | 3/2014 | Johnson et al. |
| 8,711,465 B2 | 4/2014 | Bhatnagar et al. |
| 8,800,221 B1 | 8/2014 | Header |
| 8,810,889 B2 | 8/2014 | Brown |
| 9,019,588 B2 | 4/2015 | Brown et al. |
| 9,436,054 B2 | 9/2016 | Brown et al. |
| 9,442,339 B2 | 9/2016 | Parker et al. |
| 9,482,922 B2 | 11/2016 | Brown et al. |
| 9,671,665 B2 | 6/2017 | Brown et al. |
| 9,690,162 B2 | 6/2017 | Wilbur et al. |
| 9,728,920 B2 | 8/2017 | Brown et al. |
| 9,769,459 B2 | 9/2017 | Thompson et al. |
| 10,139,696 B2 | 11/2018 | Brown et al. |
| 10,139,697 B2 | 11/2018 | Wilbur et al. |
| 10,175,549 B2 | 1/2019 | Brown et al. |
| 10,180,606 B2 | 1/2019 | Mullins et al. |
| 10,288,971 B2 | 5/2019 | Phillips et al. |

(56) References Cited

U.S. PATENT DOCUMENTS

| | | |
|---|---|---|
| 10,322,680 B2 | 6/2019 | Terashima et al. |
| 10,591,799 B2 | 3/2020 | Brown |
| 10,678,103 B2 | 6/2020 | Mullins et al. |
| 11,067,869 B2 | 7/2021 | Brown et al. |
| 11,092,868 B2 | 8/2021 | Phillips et al. |
| 11,181,797 B2 | 11/2021 | Brown et al. |
| 11,255,120 B2 | 2/2022 | Shrivastava et al. |
| 11,262,626 B2 | 3/2022 | Mullins et al. |
| 11,352,834 B2 | 6/2022 | Brown et al. |
| 11,408,223 B2 | 8/2022 | Brown |
| 11,719,039 B2 | 8/2023 | Brown et al. |
| 11,719,992 B2 | 8/2023 | Brown et al. |
| 11,733,579 B2 | 8/2023 | Phillips et al. |
| 12,085,818 B2 | 9/2024 | Mullins et al. |
| 2002/0075552 A1 | 6/2002 | Poll et al. |
| 2003/0111447 A1 | 6/2003 | Corkum et al. |
| 2003/0191546 A1 | 10/2003 | Bechtel et al. |
| 2003/0210450 A1 | 11/2003 | Yu et al. |
| 2003/0227663 A1 | 12/2003 | Agrawal et al. |
| 2004/0047050 A1 | 3/2004 | Bauer et al. |
| 2004/0208600 A1 | 10/2004 | Guenter et al. |
| 2005/0002081 A1 | 1/2005 | Beteille et al. |
| 2005/0166495 A1 | 8/2005 | Cho et al. |
| 2006/0077511 A1 | 4/2006 | Poll et al. |
| 2006/0187608 A1 | 8/2006 | Stark |
| 2006/0283084 A1 | 12/2006 | Johnson |
| 2007/0020442 A1 | 1/2007 | Giron et al. |
| 2007/0067048 A1 | 3/2007 | Bechtel et al. |
| 2007/0103761 A1 | 5/2007 | Giron et al. |
| 2007/0133078 A1 | 6/2007 | Fanton et al. |
| 2007/0236180 A1 | 10/2007 | Rodgers |
| 2007/0248756 A1 | 10/2007 | Krisko et al. |
| 2008/0238706 A1 | 10/2008 | Kenwright |
| 2008/0239452 A1 | 10/2008 | Xu et al. |
| 2008/0310007 A1 | 12/2008 | Agrawal et al. |
| 2009/0016715 A1 | 1/2009 | Furey |
| 2009/0058295 A1 | 3/2009 | Auday et al. |
| 2009/0067031 A1 | 3/2009 | Piroux et al. |
| 2009/0097098 A1 | 4/2009 | Piroux |
| 2009/0110918 A1 | 4/2009 | Jacquiod et al. |
| 2009/0114928 A1 | 5/2009 | Messere et al. |
| 2009/0130409 A1 | 5/2009 | Reutler et al. |
| 2009/0148642 A1 | 6/2009 | Mauser et al. |
| 2009/0153208 A1 | 6/2009 | Lynch |
| 2009/0157358 A1 | 6/2009 | Kim |
| 2009/0174300 A1 | 7/2009 | Jousse et al. |
| 2009/0181203 A1 | 7/2009 | Valentin et al. |
| 2009/0231662 A1 | 9/2009 | Sorensson et al. |
| 2009/0251758 A1 | 10/2009 | Valentin et al. |
| 2009/0255576 A1 | 10/2009 | Tischler |
| 2009/0262411 A1 | 10/2009 | Karmhag et al. |
| 2009/0297806 A1 | 12/2009 | Dawson-Elli et al. |
| 2009/0323160 A1 | 12/2009 | Egerton et al. |
| 2009/0323162 A1 | 12/2009 | Fanton et al. |
| 2010/0067090 A1 | 3/2010 | Egerton et al. |
| 2010/0146883 A1 | 6/2010 | Benkel |
| 2010/0208326 A1 | 8/2010 | Kwak et al. |
| 2010/0243427 A1 | 9/2010 | Kozlowski et al. |
| 2010/0245973 A1 | 9/2010 | Wang et al. |
| 2010/0315693 A1* | 12/2010 | Lam ............... G02F 1/0018 359/275 |
| 2011/0043885 A1 | 2/2011 | Lamine et al. |
| 2011/0048614 A1 | 3/2011 | Veerasamy |
| 2011/0051221 A1 | 3/2011 | Veerasamy |
| 2011/0059275 A1 | 3/2011 | Stark |
| 2011/0094585 A1 | 4/2011 | Debije et al. |
| 2011/0148218 A1 | 6/2011 | Rozbicki |
| 2011/0211247 A1 | 9/2011 | Kozlowski et al. |
| 2011/0216389 A1 | 9/2011 | Piroux et al. |
| 2011/0248014 A1 | 10/2011 | Chubb |
| 2011/0249314 A1 | 10/2011 | Wang et al. |
| 2011/0260961 A1 | 10/2011 | Burdis |
| 2011/0266137 A1 | 11/2011 | Wang et al. |
| 2011/0266138 A1 | 11/2011 | Wang et al. |
| 2011/0267672 A1 | 11/2011 | Sbar et al. |
| 2011/0267674 A1 | 11/2011 | Wang et al. |
| 2011/0267675 A1 | 11/2011 | Wang et al. |
| 2011/0279882 A1 | 11/2011 | Chan et al. |
| 2011/0292488 A1 | 12/2011 | McCarthy et al. |
| 2011/0299149 A1 | 12/2011 | Park et al. |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0133315 A1 | 5/2012 | Berman et al. |
| 2012/0147449 A1 | 6/2012 | Bhatnagar et al. |
| 2012/0194895 A1 | 8/2012 | Podbelski et al. |
| 2012/0200908 A1 | 8/2012 | Bergh et al. |
| 2012/0239209 A1 | 9/2012 | Brown et al. |
| 2012/0268803 A1 | 10/2012 | Greer et al. |
| 2012/0300280 A1 | 11/2012 | Murphy et al. |
| 2012/0327499 A1 | 12/2012 | Parker et al. |
| 2013/0057937 A1 | 3/2013 | Berman et al. |
| 2013/0085614 A1 | 4/2013 | Wenzel et al. |
| 2013/0143419 A1 | 6/2013 | Wei et al. |
| 2013/0157493 A1 | 6/2013 | Brown |
| 2013/0241299 A1 | 9/2013 | Snyker et al. |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0278988 A1 | 10/2013 | Jack et al. |
| 2013/0319756 A1 | 12/2013 | Snyker et al. |
| 2014/0000191 A1 | 1/2014 | Snyker et al. |
| 2014/0007530 A1 | 1/2014 | Liao |
| 2014/0041933 A1 | 2/2014 | Snyker et al. |
| 2014/0160550 A1 | 6/2014 | Brown et al. |
| 2014/0170863 A1 | 6/2014 | Brown |
| 2014/0192393 A1 | 7/2014 | Bhatnagar et al. |
| 2014/0247475 A1 | 9/2014 | Parker et al. |
| 2014/0317514 A1 | 10/2014 | Bokotey |
| 2014/0349497 A1 | 11/2014 | Brown et al. |
| 2014/0355097 A1 | 12/2014 | Brown et al. |
| 2015/0002919 A1 | 1/2015 | Jack et al. |
| 2015/0070745 A1 | 3/2015 | Pradhan |
| 2015/0092260 A1 | 4/2015 | Parker et al. |
| 2015/0103389 A1 | 4/2015 | Klawuhn et al. |
| 2015/0118869 A1 | 4/2015 | Brown et al. |
| 2015/0219975 A1 | 8/2015 | Phillips et al. |
| 2016/0027391 A1 | 1/2016 | Gibson et al. |
| 2016/0091769 A1 | 3/2016 | Rozbicki |
| 2016/0134932 A1 | 5/2016 | Karp et al. |
| 2016/0344148 A1 | 11/2016 | Mullins et al. |
| 2016/0357083 A1 | 12/2016 | Brown et al. |
| 2017/0006679 A1 | 1/2017 | Chin et al. |
| 2017/0045795 A1 | 2/2017 | Brown et al. |
| 2017/0082903 A1 | 3/2017 | Vigano et al. |
| 2017/0097553 A1 | 4/2017 | Jack et al. |
| 2017/0104318 A1 | 4/2017 | Uno |
| 2017/0117674 A1 | 4/2017 | Brown et al. |
| 2017/0219908 A1 | 8/2017 | Brown et al. |
| 2017/0250163 A1 | 8/2017 | Wilbur et al. |
| 2018/0130455 A1 | 5/2018 | Plummer et al. |
| 2018/0144696 A1 | 5/2018 | Zhang et al. |
| 2018/0198232 A1 | 7/2018 | Troufflard et al. |
| 2018/0301858 A9 | 10/2018 | Mullins et al. |
| 2018/0314100 A1 | 11/2018 | Mullins et al. |
| 2019/0056631 A1 | 2/2019 | Brown et al. |
| 2019/0121214 A1 | 4/2019 | Wilbur et al. |
| 2019/0196292 A1 | 6/2019 | Brown et al. |
| 2019/0243207 A1 | 8/2019 | Brown et al. |
| 2019/0265571 A1 | 8/2019 | Phillips et al. |
| 2020/0080364 A1 | 3/2020 | Shrivastava et al. |
| 2020/0260556 A1 | 8/2020 | Rozbicki et al. |
| 2020/0301236 A1 | 9/2020 | Brown et al. |
| 2020/0310214 A1 | 10/2020 | Brown |
| 2020/0393719 A1 | 12/2020 | Mullins et al. |
| 2021/0149266 A1 | 5/2021 | Brown et al. |
| 2021/0333679 A1 | 10/2021 | Phillips et al. |
| 2022/0136319 A1 | 5/2022 | Shrivastava et al. |
| 2022/0187671 A1 | 6/2022 | Brown et al. |
| 2022/0214575 A1 | 7/2022 | Mullins et al. |
| 2022/0325574 A1 | 10/2022 | Brown et al. |
| 2023/0288771 A1 | 9/2023 | Frank et al. |

(56) References Cited

U.S. PATENT DOCUMENTS

| | | |
|---|---|---|
| 2024/0045299 A1 | 2/2024 | Brown et al. |
| 2024/0085754 A1 | 3/2024 | Martinson et al. |
| 2024/0210782 A1 | 6/2024 | Brown et al. |

FOREIGN PATENT DOCUMENTS

| | | |
|---|---|---|
| CN | 101365850 A | 2/2009 |
| CN | 102253559 A | 11/2011 |
| CN | 202108407 U | 1/2012 |
| CN | 202157436 U | 3/2012 |
| CN | 102797310 A | 11/2012 |
| CN | 103649826 A | 3/2014 |
| CN | 106125442 A | 11/2016 |
| CN | 106837094 A | 6/2017 |
| CN | 110515425 A | 11/2019 |
| DE | 2113876 A1 | 10/1972 |
| DE | 3531443 A1 | 3/1986 |
| DE | 10322561 A1 | 12/2004 |
| DE | 102006042538 A1 | 3/2008 |
| EP | 1267029 A1 | 12/2002 |
| EP | 0676058 B1 | 4/2003 |
| EP | 1529922 A2 | 5/2005 |
| EP | 2136409 A1 | 12/2009 |
| EP | 2348357 A2 | 7/2011 |
| FR | 2938289 A1 | 5/2010 |
| GB | 1437198 A | 5/1976 |
| JP | 2000257352 A | 9/2000 |
| JP | 2001193364 A | 7/2001 |
| JP | 2004504630 A | 2/2004 |
| JP | 2006095040 A | 4/2006 |
| JP | 2007516147 A | 6/2007 |
| JP | 2009544997 A | 12/2009 |
| KR | 100909893 B1 | 7/2009 |
| KR | 101457323 B1 | 11/2014 |
| KR | 101495310 B1 | 2/2015 |
| KR | 20150089161 A | 8/2015 |
| KR | 20180024214 A | 3/2018 |
| KR | 101930724 B1 | 12/2018 |
| TW | 185608 | 6/1992 |
| TW | 526383 B | 4/2003 |
| WO | WO-9842163 A1 | 9/1998 |
| WO | WO-0208826 A1 | 1/2002 |
| WO | WO-02101188 A1 | 12/2002 |
| WO | WO-2005076061 A1 | 8/2005 |
| WO | WO-2006133298 A2 | 12/2006 |
| WO | WO-2006133298 A3 | 12/2007 |
| WO | WO-2008043951 A2 | 4/2008 |
| WO | WO-2009097001 A1 | 8/2009 |
| WO | WO-2009145876 A1 | 12/2009 |
| WO | WO-2009148861 A2 | 12/2009 |
| WO | WO-2009158510 A2 | 12/2009 |
| WO | WO-2010077409 A2 | 7/2010 |
| WO | WO-2011010067 A2 | 1/2011 |
| WO | WO-2011028253 A2 | 3/2011 |
| WO | WO-2011028254 A2 | 3/2011 |
| WO | WO-2011050291 A2 | 4/2011 |
| WO | WO-2011109688 A1 | 9/2011 |
| WO | WO-2012145155 A1 | 10/2012 |
| WO | WO-2013090264 A1 | 6/2013 |
| WO | WO-2013109881 A2 | 7/2013 |
| WO | WO-2013177575 A1 | 11/2013 |
| WO | WO-2014032023 A1 | 2/2014 |
| WO | WO-2014169253 A1 | 10/2014 |
| WO | WO-2015120063 A1 | 8/2015 |
| WO | WO-2015134789 A1 | 9/2015 |
| WO | WO-2016004109 A1 | 1/2016 |
| WO | WO-2017192881 A1 | 11/2017 |
| WO | WO-2018098089 A1 | 5/2018 |
| WO | WO-2018191499 A1 | 10/2018 |
| WO | WO-2019040809 A1 | 2/2019 |
| WO | WO-2019141749 A1 | 7/2019 |
| WO | WO-2020007638 A1 | 1/2020 |
| WO | WO-2020084083 A1 | 4/2020 |
| WO | WO-2022072454 A1 | 4/2022 |

OTHER PUBLICATIONS

Boylestad, R., et al., "Electronic devices and circuit theory (7th Edition)," 1999, pp. 76-82.
Canadian Office Action dated May 1, 2019 in CA Application No. 2,882,878.
CN Office Action dated Aug. 15, 2019 in CN Application No. 201610921855.7.
CN Office Action dated Dec. 18, 2018 in CN Application No. 201610921855.7.
CN Office Action dated Jan. 13, 2021 in CN Application No. 201780082949.2.
CN Office Action dated Jul. 21, 2021 in CN Application No. 201780082949.2.
CN Office Action dated Jun. 3, 2015 in CN Application No. 201280069715.1.
CN Office Action dated Mar. 11, 2016 in CN Application No. 201280069715.1.
CN Office Action dated Mar. 27, 2020 in CN Application No. 201610921855.7.
CN Office Action dated Mar. 29, 2018 in CN Application No. 201610921855.7.
CN Office Action dated May 26, 2020 in CN Application No. 201780082949.2.
CN Office Action dated Nov. 4, 2020 in CN Application No. 201610921855.7.
EP Office Action dated May 20, 2022, in Application No. EP20170880595.8.
EP Office Action dated Nov. 4, 2013 for EP Application No. 11846667.1.
Ernst, Randi, "Gas Filling of IG Units" by FDR Design, Inc. (known as of Jun. 30, 2014), 37 pages.
European Office Action dated Apr. 30, 2021 for EP Application No. 18194665.8.
European Office Action dated Dec. 8, 2017 in EP Application No. 13830992.7.
European Office Action dated Jul. 1, 2016 for EP Application No. 12858168.3.
European Office Action dated Jul. 18, 2018 in EP Application No. 13830992.7.
European Office Action dated Jul. 25, 2019 in EP Application No. 13830992.7.
European Office Action dated Mar. 13, 2017 for EP Application No. 12858168.3.
European Office Action dated Mar. 19, 2019 in EP Application No. 13830992.7.
European Opposition Communication dated Jan. 31, 2020 enclosing Letter from Opponent to EP Patent No. 2,791,451 (EP Application No. 12858168.3) by GEZE Gmbh.
European Opposition Communication dated Jun. 2, 2021 from Opponent to EP Patent No. 2,791,451 (EP Application No. 12858168.3) by GEZE Gmbh.
European Opposition dated Jun. 25, 2019 to EP Patent No. 2,791,451 (EP Application No. 12858168.3) by GEZE Gmbh.
European Search Report dated Apr. 2, 2015 for EP Application No. 12858168.3.
European Search Report dated Mar. 3, 2014 for EP Application No. 11846667.1.
Extended European Search Report dated May 14, 2021 for EP Application No. 21152835.1.
Extended European Search Report dated Dec. 14, 2018 for EP Application No. 18194665.8.
Extended European Search Report dated Jul. 15, 2016 for EP Application No. 13830992.7.
Extended European Search Report dated Nov. 2, 2020 in EP Application No. 17880595.8.
Final Office Action dated Jun. 5, 2015 in U.S. Appl. No. 13/968,258.
Final Office Action dated Sep. 11, 2015 for U.S. Appl. No. 14/591,851.
Halio Black Insulated Glass Unit, Product Data Sheet, Kinestral Technologies, 2020, 5 pp.
"Halio Smart-Tinting Glass System," Product Data Sheet, Kinestral Technologies, www.kinestral.com, copyright 2017, 4 pp.

(56) References Cited

OTHER PUBLICATIONS

International Preliminary Report on Patentability dated Aug. 9, 2016 for PCT/US2015/014479.
International Preliminary Report on Patentability dated Jun. 20, 2013, from PCT/US2011/063534.
International Preliminary Report on Patentability dated Jun. 26, 2014 from PCT/US2012/068950.
International Preliminary Report on Patentability dated Jun. 27, 2019 for PCT/US2017/066486.
International Preliminary Report on Patentability dated Mar. 5, 2015 for PCT/US2013/056506.
International Preliminary Report on Patentability dated Nov. 6, 2014 for PCT/US2013/037644.
International Preliminary Report on Patentability for PCT/2013/042765 dated Dec. 4, 2014.
International Search Report and Written Opinion dated Apr. 1, 2013 from PCT/US2012/068950.
International Search Report and Written Opinion dated Apr. 13, 2018 for PCT/US2017/066486.
International Search Report and Written Opinion dated Aug. 12, 2013 for PCT/US2013/037644.
International Search Report and Written Opinion dated Aug. 19, 2014 for PCT/US2014/033870.
International Search Report and Written Opinion dated Jul. 23, 2012, from PCT/US2011/063534.
International Search Report and Written Opinion dated May 18, 2015 from PCT/US2015/014479.
International Search Report and Written Opinion dated Nov. 22, 2013 for PCT/US2013/056506.
International Search Report and Written Opinion for PCT/2013/042765 dated Aug. 23, 2013.
"'Smart glass' changes colour and produces electricity", ZeeNewsIndia.com [http://zeenews.india.com/news/sci-tech/smart-glass-changes-colour-and-produces-electricity_1577561.html] Apr. 12, 2015.
McManis, C., "H-Bridges: theory and practice," Chuck's Robotics Notebook, 2004, 3 pp.
McWane, J., "Introduction to Electronics Technology (2nd Edition)," 1981, p. 12 & pp. 228-233.
Notice of Allowance (2nd corrected) dated Aug. 9, 2016 for U.S. Appl. No. 14/591,851.
Notice of Allowance (corrected) dated Jun. 30, 2016 for U.S. Appl. No. 14/591,851.
Notice of Allowance dated Feb. 25, 2015 for U.S. Appl. No. 14/325,290.
Notice of Allowance dated Jun. 13, 2014 for U.S. Appl. No. 14/103,660, and allowed claims.
Notice of Allowance dated May 19, 2015 in U.S. Appl. No. 14/152,873.
Notice of Allowance dated May 9, 2016 for U.S. Appl. No. 14/591,851.
Notice of Allowance dated Oct. 13, 2021 in U.S. Appl. No. 16/883,975.
Notice of Allowance dated Oct. 29, 2021 in U.S. Appl. No. 16/469,848.
Notice of Allowance dated Oct. 9, 2014 for U.S. Appl. No. 14/325,290.
Notice of Allowance dated Sep. 18, 2013 for U.S. Appl. No. 13/326,168.
Office Action dated Feb. 4, 2015 for U.S. Appl. No. 14/591,851.
Office Action dated Jan. 30, 2015 in U.S. Appl. No. 14/152,873.
Office Action dated Jul. 11, 2013 in U.S. Appl. No. 13/312,057.
Office Action dated Mar. 31, 2015 in U.S. Appl. No. 14/196,895.
Office Action dated Novembers, 2014 in U.S. Appl. No. 13/456,056.
Office Action dated Oct. 6, 2014 in U.S. Appl. No. 13/968,258.
Partial European Search Report dated Mar. 21, 2016 for EP Application No. 13830992.7.
Preliminary Amendment filed Jun. 22, 2017 for U.S. Appl. No. 15/493,003.
Preliminary Amendment filed Jun. 26, 2018 for U.S. Appl. No. 16/016,450.
Preliminary Amendment filed Oct. 18, 2016 in U.S. Appl. No. 15/228,992.
Preliminary Amendment filed Sep. 26, 2017 for U.S. Appl. No. 15/597,041.
TW Decision of Rejection dated Jan. 30, 2020 in TW Application No. 106129194.
TW Office Action dated Aug. 23, 2018 in TW Application No. 106129194.
TW Office Action dated Jun. 25, 2019 in TW Application No. 106129194.
TW Office Action dated Oct. 26, 2021, in application No. 106144418 with English translation.
TW Office Action dated Oct. 28, 2016 in TW Application No. 101147237.
TW Search Report received with TW Decision to Grant dated Apr. 27, 2021 in TW Application No. 106129194.
U.S. Appl. No. 17/816,548, inventors Brown et al., filed Aug. 1, 2022.
US Corrected Notice of Allowability dated Oct. 22, 2021, in U.S. Appl. No. 16/197,178.
U.S. Corrected Notice of Allowance dated Apr. 26, 2022 in U.S. Appl. No. 16/777,758.
U.S. Corrected Notice of Allowance dated Jan. 31, 2022 in U.S. Appl. No. 16/883,975.
U.S. Corrected Notice of Allowance dated May 10, 2022 in U.S. Appl. No. 16/168,720.
US Final Office Action dated Aug. 8, 2018 in U.S. Appl. No. 14/423,085.
US Final Office Action dated Jan. 10, 2017 for U.S. Appl. No. 14/401,081.
US Final Office Action dated Jan. 6, 2021 in U.S. Appl. No. 16/386,096.
US Final Office Action dated Jul. 5, 2018 for U.S. Appl. No. 14/401,081.
US Final Office Action dated Mar. 31, 2021 in U.S. Appl. No. 16/407,080.
US Final Office Action dated Mar. 6, 2020 in U.S. Appl. No. 16/386,096.
US Final Office Action dated Nov. 25, 2020 in U.S. Appl. No. 16/407,080.
US Final Office Action Sep. 25, 2017 for U.S. Appl. No. 14/401,081.
U.S. Non-Final Office Action dated May 25, 2022, in U.S. Appl. No. 16/946,196.
US Notice of Allowability (Corrected) dated May 10, 2017 for U.S. Appl. No. 14/363,769.
US Notice of Allowance (corrected) dated Apr. 19, 2019 in U.S. Appl. No. 14/423,085.
US Notice of Allowance dated Apr. 11, 2018 for U.S. Appl. No. 15/243,816.
US Notice of Allowance dated Apr. 21, 2021 in U.S. Appl. No. 16/386,096.
US Notice of Allowance dated Aug. 23, 2018 for U.S. Appl. No. 15/243,816.
US Notice of Allowance dated Dec. 12, 2019 for U.S. Appl. No. 16/163,445.
US Notice of Allowance dated Dec. 5, 2017 for U.S. Appl. No. 15/243,816.
US Notice of Allowance dated Feb. 15, 2017 for U.S. Appl. No. 15/217,873.
US Notice of Allowance dated Feb. 21, 2020 for U.S. Appl. No. 16/016,450.
US Notice of Allowance dated Jan. 25, 2018 for U.S. Appl. No. 15/228,992.
U.S. Notice of Allowance dated Jan. 27, 2022 in U.S. Appl. No. 16/168,720.
US Notice of Allowance dated Jan. 31, 2018 for U.S. Appl. No. 15/493,003.
US Notice of Allowance dated Jul. 14, 2021 for U.S. Appl. No. 16/197,178.
US Notice of Allowance dated Jul. 19, 2018 for U.S. Appl. No. 15/597,041.
US Notice of Allowance dated Jul. 23, 2018 for U.S. Appl. No. 15/493,003.

(56) References Cited

OTHER PUBLICATIONS

US Notice of Allowance dated Jul. 31, 2019 for U.S. Appl. No. 16/163,445.
US Notice of Allowance dated Jun. 20, 2016 in U.S. Appl. No. 13/968,258.
US Notice of Allowance dated Mar. 14, 2019 for U.S. Appl. No. 16/163,445.
US Notice of Allowance dated Mar. 17, 2017 for U.S. Appl. No. 15/394,637.
U.S. Notice of Allowance dated Mar. 22, 2022 in U.S. Appl. No. 16/777,758.
US Notice of Allowance dated Mar. 28, 2018 for U.S. Appl. No. 15/597,041.
US Notice of Allowance dated May 23, 2018 for U.S. Appl. No. 15/228,992.
US Notice of Allowance dated Nov. 14, 2019 for U.S. Appl. No. 16/016,450.
US Notice of Allowance dated Nov. 18, 2016 for U.S. Appl. No. 14/363,769.
US Notice of Allowance dated Nov. 29, 2018 in U.S. Appl. No. 14/423,085.
US Notice of Allowance dated Oct. 11, 2017 for U.S. Appl. No. 15/228,992.
U.S. Notice of Allowance dated Oct. 18, 2021, in U.S. Appl. No. 16/469,848.
US Notice of Allowance dated Oct. 3, 2018 for U.S. Appl. No. 15/228,992.
US Notice of Allowance dated Oct. 5, 2017 for U.S. Appl. No. 15/493,003.
US Notice of allowance dated Sep. 17, 2021, in U.S. Appl. No. 16/168,720.
US Office Action dated Apr. 16, 2020 in U.S. Appl. No. 16/407,080.
US Office Action dated August 8, 2 019 in U.S. Appl. No. 16/386,096.
US Office Action dated Dec. 15, 2017 in U.S. Appl. No. 14/423,085.
US Office Action dated Dec. 23, 2020 for U.S. Appl. No. 16/197,178.
US Office Action dated Jan. 21, 2016 in U.S. Appl. No. 13/968,258.
US Office Action dated Jan. 7, 2021 in U.S. Appl. No. 16/469,848.
US Office Action dated Jul. 15, 2016 for U.S. Appl. No. 14/401,081.
US Office Action dated Jun. 27, 2016 for U.S. Appl. No. 14/363,769.
US Office Action dated Mar. 17, 2021 for U.S. Appl. No. 16/168,720.
US Office Action dated Mar. 8, 2018 for U.S. Appl. No. 14/401,081.
US Office Action dated May 4, 2017 for U.S. Appl. No. 14/401,081.
US Office Action dated Nov. 29, 2019 in U.S. Appl. No. 16/407,080.
US Office Action dated Sep. 10, 2020 in U.S. Appl. No. 16/386,096.
US Office Action dated Sep. 21, 2021, in U.S. Appl. No. 16/777,758.
U.S. Appl. No. 16/883,975, inventors Mullins et al. , filed May 26, 2020.
U.S. Appl. No. 63/154,352, Inventors Martinson et al., filed Feb. 26, 2021.
U.S. Appl. No. 63/170,245, Inventors Martinson et al., filed Apr. 2, 2021.
U.S. Appl. No. 63/212,483, inventors Martinson et al., filed Jun. 18, 2021.
U.S. Appl. No. 17/450,950, filed Oct. 14, 2021.
U.S. Appl. No. 17/660,781, filed Apr. 26, 2022.
US Preliminary Amendment dated Jan. 23, 2020 in U.S. Appl. No. 16/469,848.
Velux SageGlass Flyer, 2007, 4 pages.
Westinghouse User's Manual, "LD-325 Series," 2010, 67 pp.
EP Office Action dated Jan. 10, 2023 for EP Application No. 18194665.8.
U.S. Non-Final office Action dated Sep. 1, 2022 in U.S. Appl. No. 17/247,662.
U.S. Final office Action dated Jan. 6, 2023 in U.S. Appl. No. 16/946,196.
U.S. Non-Final office Action dated Nov. 25, 2022 in U.S. Appl. No. 17/450,950.
U.S. Non-Final Office Action dated Nov. 25, 2022 in U.S. Appl. No. 17/578,320.
U.S. Non-Final Office Action dated Nov. 25, 2022 in U.S. Appl. No. 17/660,781.
European Office Action dated Jan. 30, 2023 in Application No. EP21152835.1.
International Preliminary Report on Patentability dated Apr. 13, 2023 in PCT Application No. No. PCT/US2021/052587.
International Search Report and Written Opinion dated Mar. 8, 2022 in PCT Application No. PCT/US2021/052587.
TW Office Action dated Feb. 23, 2023 in Application No. TW111118193 with English translation.
U.S. Notice of Allowance dated Apr. 10, 2023 in U.S. Appl. No. 17/450,950.
U.S. Notice of Allowance dated Apr. 10, 2023 in U.S. Appl. No. 17/660,781.
U.S. Notice of Allowance dated Mar. 17, 2023 in U.S. Appl. No. 17/450,950.
U.S. Notice of Allowance dated Mar. 17, 2023 in U.S. Appl. No. 17/660,781.
U.S. Appl. No. 18/028,292, inventors Martinson et al., filed Mar. 24, 2023.
International Preliminary Report on Patentability dated Mar. 9, 2023 in PCT Application No. PCT/US2021/047809.
International Search Report and Written Opinion dated Jan. 10, 2022, in Application No. PCT/US2021/047809.
TW Office Action dated Feb. 14, 2022, in Application No. TW110127821 with English Translation.
TW Office Action dated Sep. 15, 2023, in application No. TW112120485 with English Translation.
U.S. Corrected Notice of Allowance dated Jul. 17, 2023, in U.S. Appl. No. 17/365,900.
U.S. Corrected Notice of Allowance dated Jun. 30, 2023, in U.S. Appl. No. 17/660,781.
U.S. Final office Action dated Jul. 5, 2023 in U.S. Appl. No. 17/578,320.
U.S. Non-Final Office Action dated Jun. 26, 2023, in U.S. Appl. No. 16/946,196.
U.S. Non-Final Office Action dated Oct. 5, 2023, in U.S. Appl. No. 17/576,862.
U.S. Notice of Allowance dated Jul. 3, 2023 in U.S. Appl. No. 17/450,950.
U.S. Notice of Allowance dated Jun. 7, 2023 in U.S. Appl. No. 17/365,900.
U.S. Appl. No. 18/338,842, inventors Brown S.C et al., filed Jun. 21, 2023.
International Search Report and Written Opinion dated Jan. 3, 2024 in PCT Application No. PCT/US2023/031768.
U.S. Final Office Action dated Feb. 14, 2024 in U.S. Appl. No. 16/946,196.
U.S. Notice of Allowance dated Nov. 20, 2023 in U.S. Appl. No. 17/578,320.
International Search Report and Written Opinion dated Feb. 22, 2024 in PCT Application No. PCT/US2023/036098.
U.S. Corrected Notice of Allowance dated Aug. 5, 2024 in U.S. Appl. No. 17/578,320.
U.S. Corrected Notice of Allowance dated Jun. 25, 2024 in U.S. Appl. No. 17/578,320.
U.S. Non-Final Office Action dated Aug. 29, 2024 in U.S. Appl. No. 16/946,196.
U.S. Non-Final Office Action dated Sep. 20, 2024 in U.S. Appl. No. 18/599,060.
U.S. Notice of Allowance dated Mar. 20, 2024 in U.S. Appl. No. 17/578,320.
U.S. Appl. No. 18/744,446, inventors Mullins D, et al., filed Jun. 14, 2024.

* cited by examiner

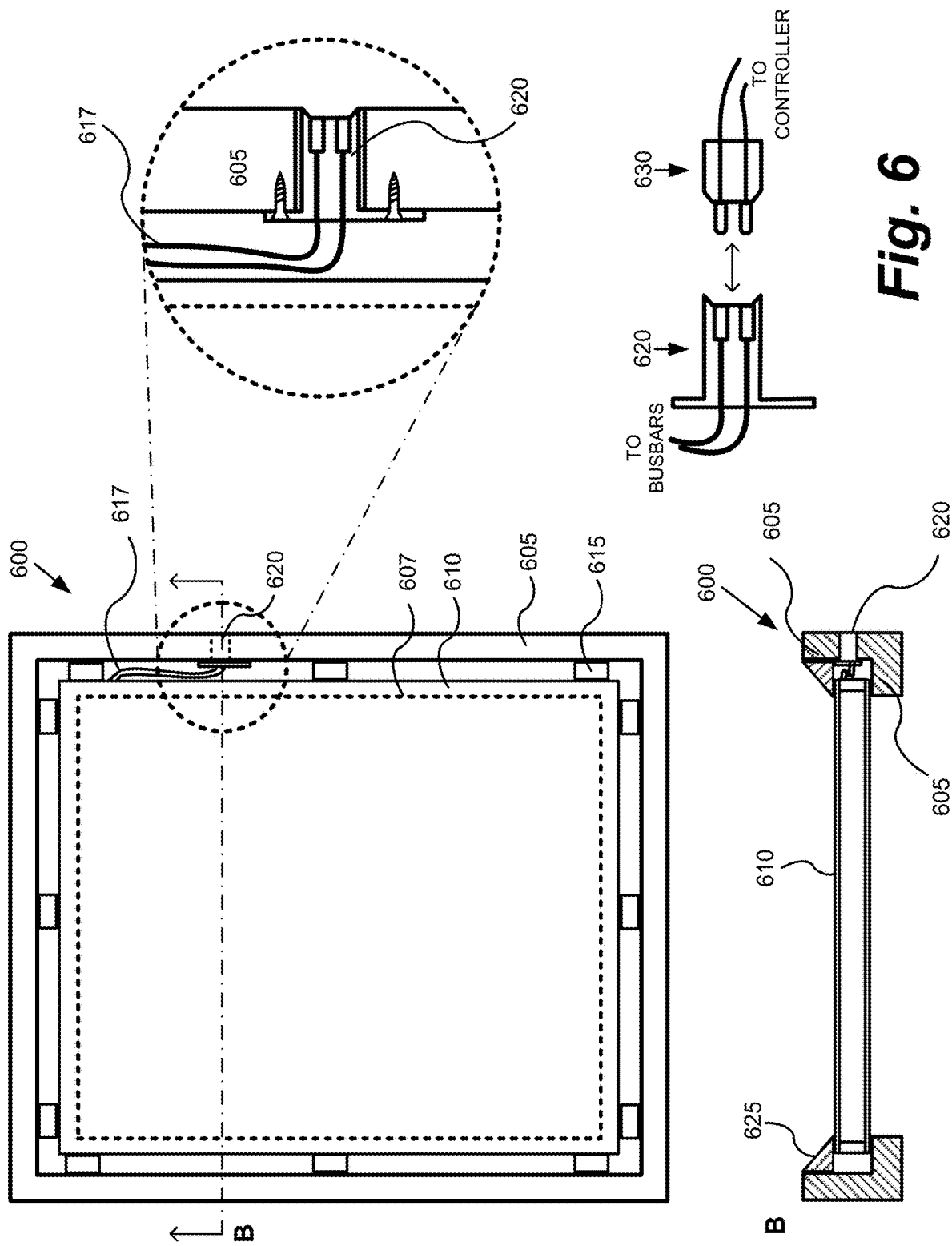

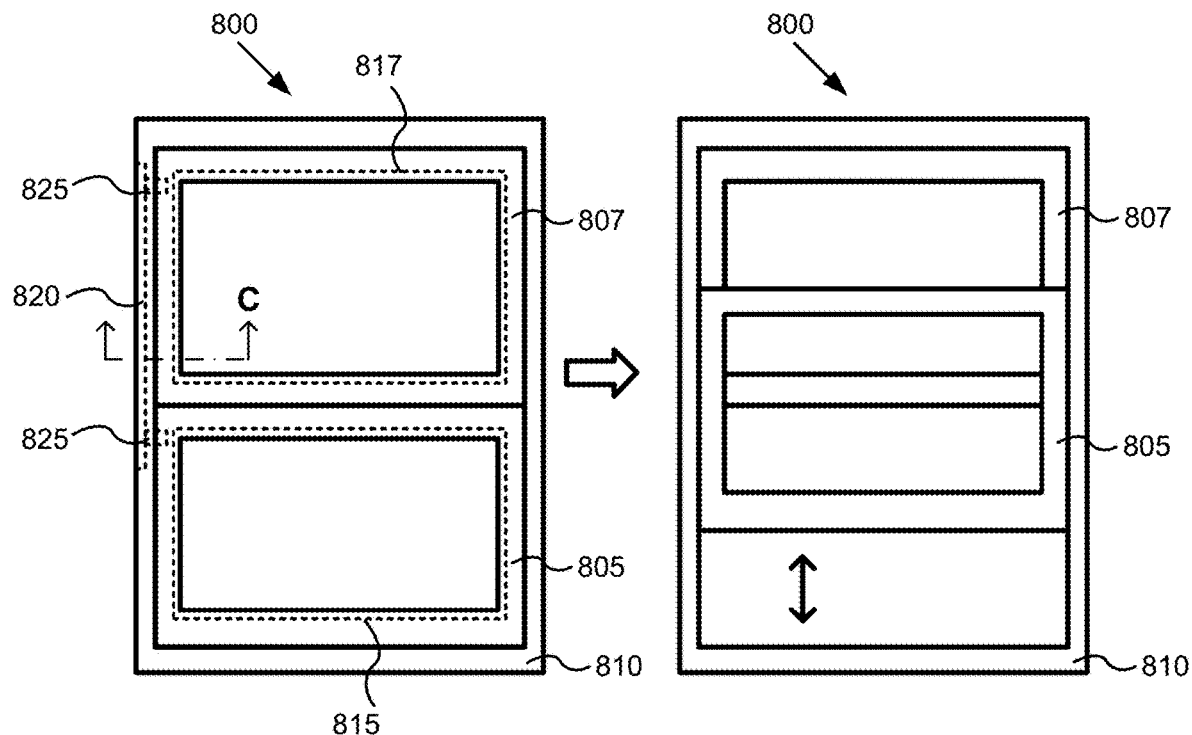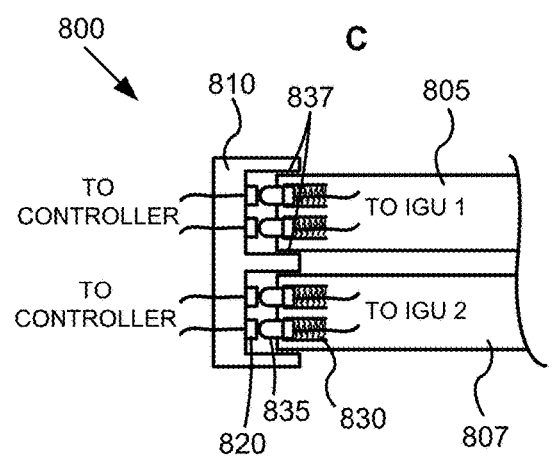
Fig. 8

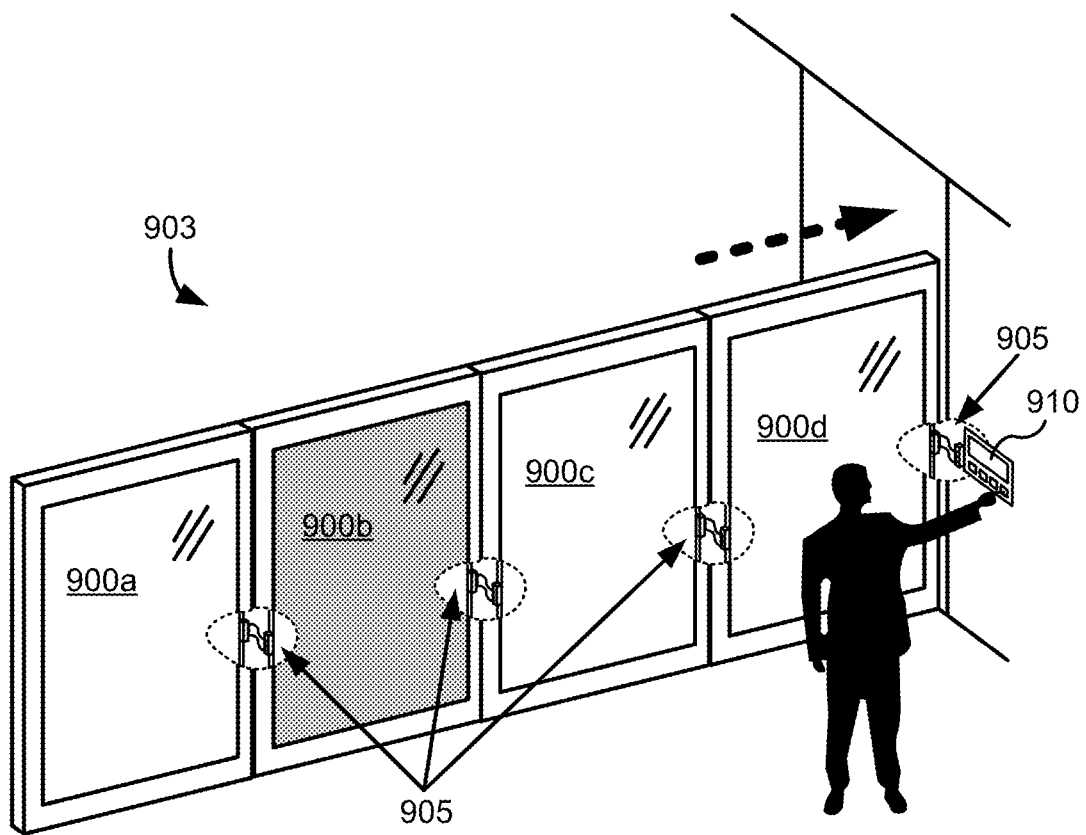
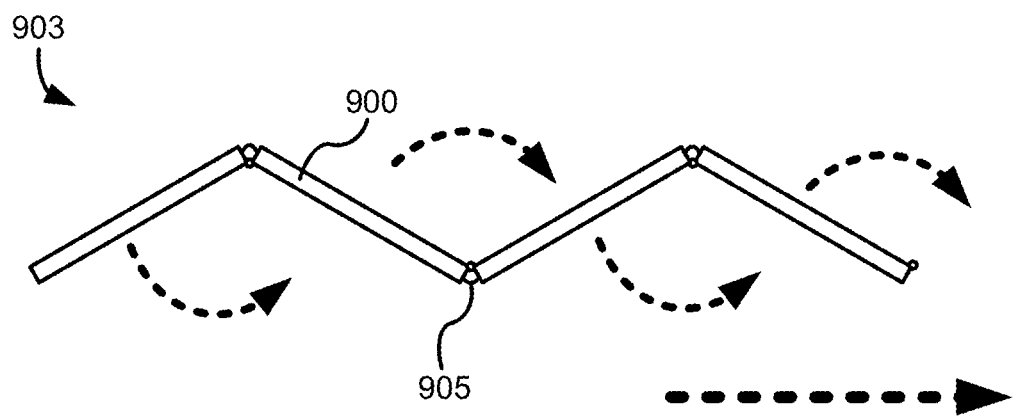
*Fig. 9B*

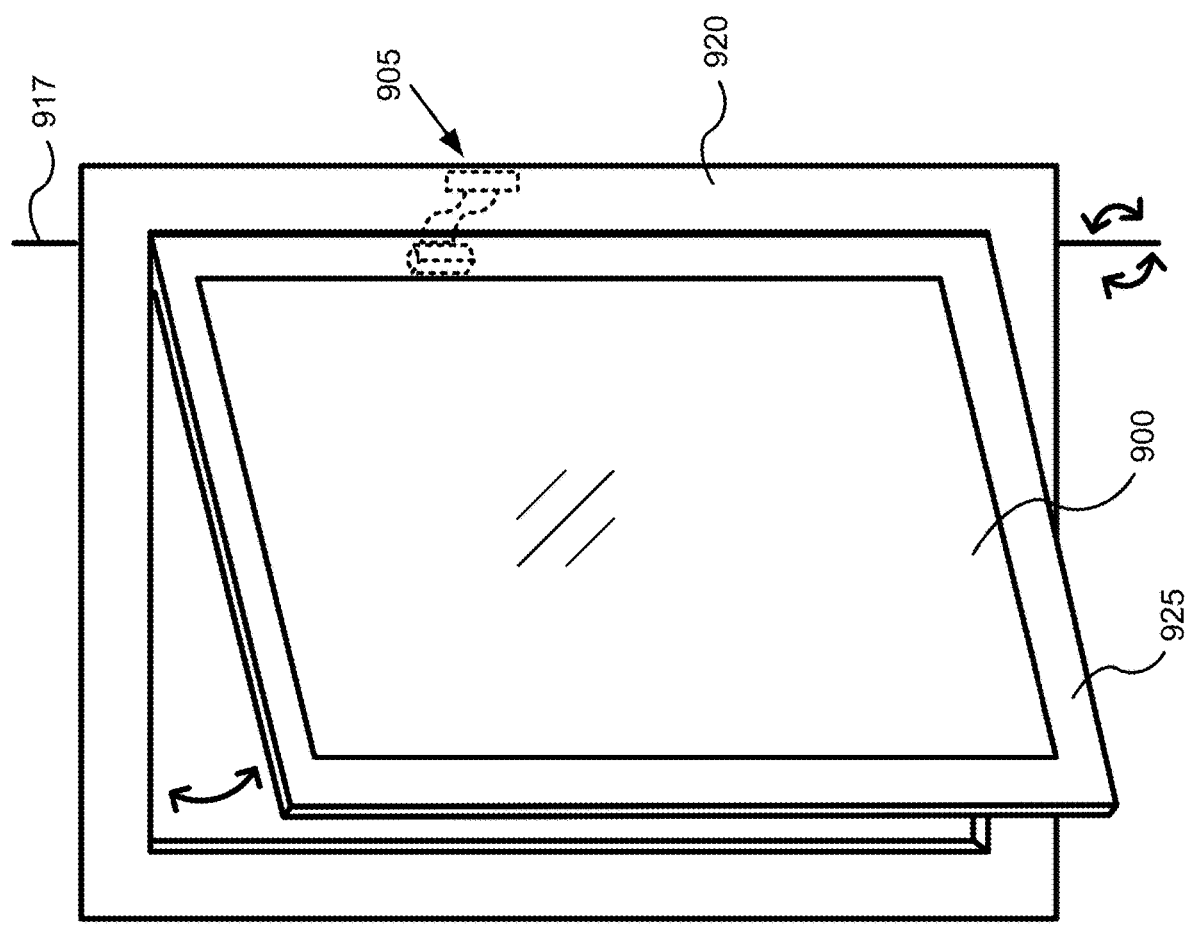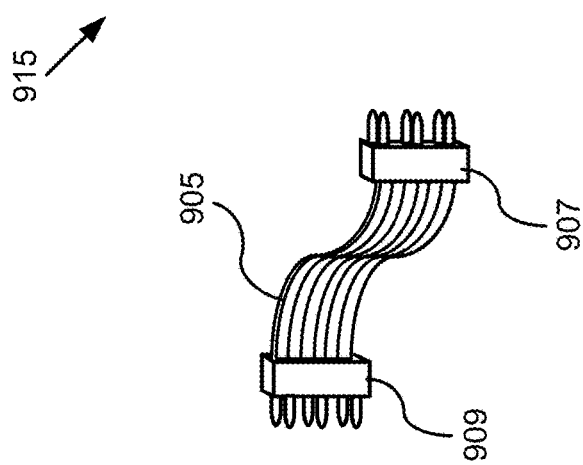
Fig. 9C

CONNECTORS FOR SMART WINDOWS

CROSS-REFERENCES TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

FIELD

The disclosed embodiments relate generally to optically switchable devices, and more particularly to connectors for optically switchable windows.

BACKGROUND

Various optically switchable devices are available for controlling tinting, reflectivity, etc. of window panes. Electrochromic devices are one example of optically switchable devices generally. Electrochromism is a phenomenon in which a material exhibits a reversible electrochemically-mediated change in an optical property when placed in a different electronic state, typically by being subjected to a voltage change. The optical property being manipulated is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial, and other uses. The color, transmittance, absorbance, and/or reflectance of such windows may be changed by inducing a change in the electrochromic material, that is, electrochromic windows are windows that can be darkened or lightened electronically. A small voltage applied to an electrochromic (EC) device of the window will cause it to darken; reversing the voltage causes it to lighten. This capability allows for control of the amount of light that passes through the window, and presents an enormous opportunity for electrochromic windows to be used not only for aesthetic purposes but also for energy-savings.

With energy conservation being foremost in modern energy policy, it is expected that growth of the EC window industry will be robust in the coming years. An important aspect of EC window engineering is how to integrate EC windows into new and existing (retrofit) applications. Of particular import is how to deliver power to the EC glazings through framing and related structures.

SUMMARY

Connectors for optically switchable devices, including electrochromic devices, are disclosed herein. A connector and an electrochromic device may be associated with or incorporated in an insulated glass unit (IGU), a window assembly, or a window unit, in some embodiments.

In one embodiment, a window unit includes an insulated glass unit including an optically switchable pane. A wire assembly is attached to an edge of the insulated glass unit and includes wires in electrical communication with distinct electrodes of the optically switchable pane. A floating connector is attached to the distal end of the wire assembly, with the floating connector being electrically coupled to the optically switchable pane. The floating connector includes a flange and a nose extending from the flange by a distance approximately equal to a thickness of a first frame in which insulated glass unit is to be mounted. The nose includes a terminal face presenting, at least, two exposed contacts of opposite polarities. Other contacts may be present, e.g., for communication to a logic circuit in the window unit. The floating connector further includes two holes in the flange for affixing the floating connector to the first frame. The two holes in the flange are arranged with respect to the nose such that the nose is closer to one of the holes than the other, thereby requiring that the two exposed contacts be arranged in a defined orientation when the floating connector is affixed to the first frame. In other embodiments, the floating connector includes an asymmetric element in the shape of the nose and/or the flange that permits installation in only one way.

In another embodiment, a window assembly includes an insulated glass unit including an optically switchable pane. A first connector is mounted to the insulated glass unit in a sealant of the insulated glass unit. The first connector includes exposed contacts electrically coupled to leads extending from the optically switchable pane and through the insulated glass unit, e.g., around the perimeter of a spacer of the IGU and to the first connector. The first connector further includes a first ferromagnetic element which itself may be magnetized. A wire assembly is configured to be detachably mounted to the insulated glass unit through the first connector. The wire assembly includes at least two wires extending from and electrically coupled to a second connector. The second connector includes a surface having contacts and the surface is shaped for mechanical engagement to the first connector. The second connector further includes a second ferromagnetic element, which itself may be magnetized. At least one of the first and second ferromagnetic elements is magnetized such that the first and second connectors may magnetically engage one another to provide electrical communication between their respective contacts.

In another embodiment, a window system includes a first insulated glass unit. The first insulated glass unit includes a first optically switchable pane and a first connector in electrical communication with electrodes of the first optically switchable pane. A first coupling unit includes two connectors linked by a flexible ribbon cable, with a first of the two connectors being configured to mate with the first connector.

These and other features and advantages will be described in further detail below, with reference to the associated drawings.

BRIEF DESCRIPTION OF THE DRAWINGS

FIG. 6 shows examples of schematic diagrams of an insulated glass unit including an electrochromic pane in a frame with a floating connector installed in the frame.

FIG. 8 shows examples of schematic diagrams of a window unit incorporating insulated glass units including electrochromic panes with detail of a connection configuration for powering the insulated glass units.

FIGS. 9A-9D show examples of schematic diagrams of insulated glass units and window units with ribbon cable connector embodiments as described herein.

DETAILED DESCRIPTION

It should be understood that while the disclosed embodiments focus on electrochromic (EC) windows (also referred to as smart windows), the concepts disclosed herein may apply to other types of switchable optical devices, including liquid crystal devices, suspended particle devices, and the like. For example, a liquid crystal device or a suspended particle device, instead of an EC device, could be incorporated in any of the disclosed embodiments.

An insulated glass unit (IGU) is part of the transparent component of a "window." In the following description, an IGU may include two substantially transparent substrates, for example, two panes of glass, where at least one substrate includes an electrochromic device disposed thereon, and the panes have a separator disposed between them. One or more of the panes may itself be a laminate structure of panes. An IGU is typically hermetically sealed, having an interior region that is isolated from the ambient environment. A window assembly may include an IGU, electrical connectors for coupling the one or more electrochromic devices of the IGU to a window controller, and a frame that supports the IGU and related wiring.

In order to orient the reader to embodiments for delivering power to one or more EC devices in an IGU and/or window assembly, an exemplary description of powering curves for transitioning an electrochromic window is presented.

Figure 1:
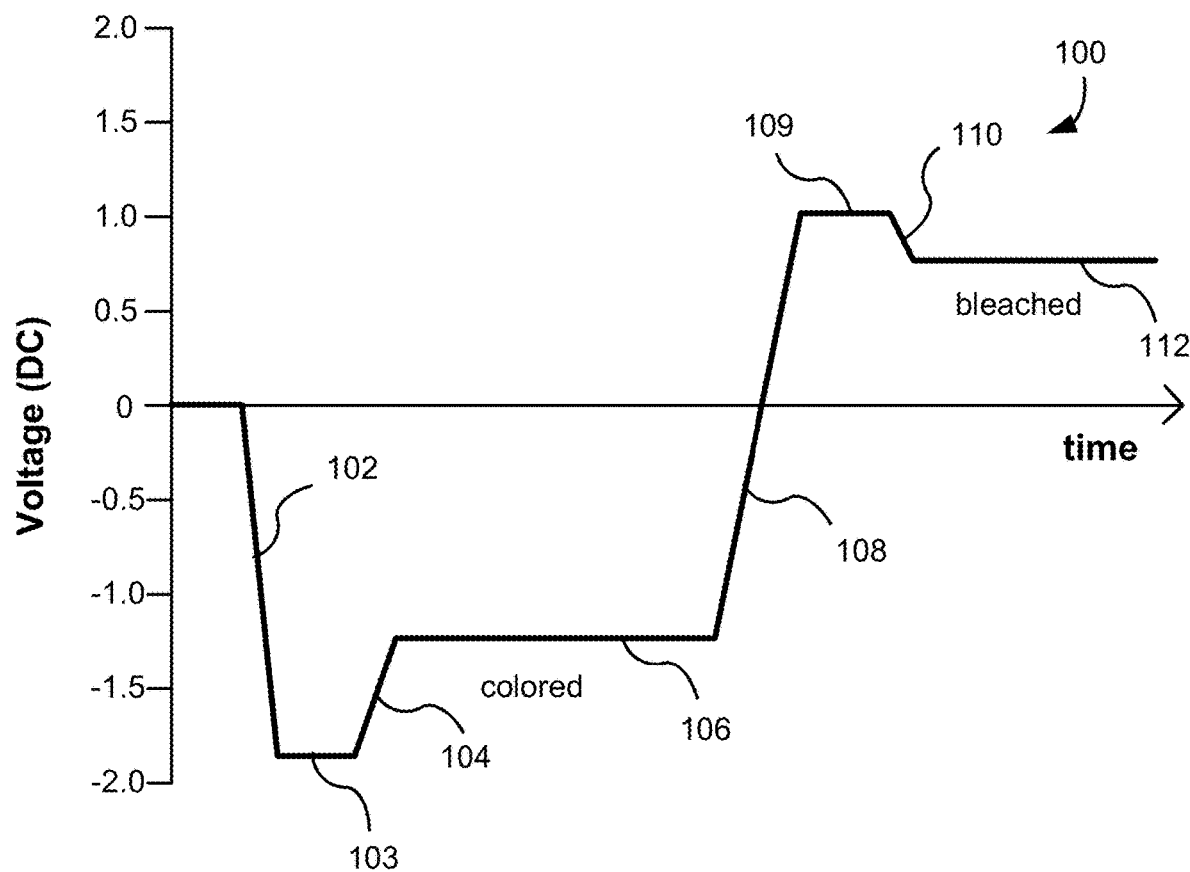
FIG. 1 shows an example of a voltage profile for driving optical state transitions for an electrochromic device.

FIG. 1 shows an example of a voltage profile for driving an optical state transition for an electrochromic device. The magnitude of the DC voltages applied to an electrochromic device may depend in part on the thickness of the electrochromic stack of the electrochromic device and the size (e.g., area) of the electrochromic device. A voltage profile, 100, includes the following sequence: a negative ramp, 102, a negative hold, 103, a positive ramp, 104, a negative hold, 106, a positive ramp, 108, a positive hold, 109, a negative ramp, 110, and a positive hold, 112. Note that the voltage remains constant during the length of time that the device remains in its defined optical state, i.e., in negative hold 106 and positive hold 112. Negative ramp 102 drives the device to the colored state and negative hold 106 maintains the device in the colored state for a desired period of time. Negative hold 103 may be for a specified duration of time or until another condition is met, such as a desired amount of charge being passed sufficient to cause the desired change in coloration, for example. Positive ramp 104, which increases the voltage from the maximum in negative voltage ramp 102, may reduce the leakage current when the colored state is held at negative hold 106.

Positive ramp 108 drives the transition of the electrochromic device from the colored to the bleached state. Positive hold 112 maintains the device in the bleached state for a desired period of time. Positive hold 109 may be for a specified duration of time or until another condition is met, such as a desired amount of charge being passed sufficient to cause the desired change in coloration, for example. Negative ramp 110, which decreases the voltage from the maximum in positive ramp 108, may reduce leakage current when the bleached state is held at positive hold 112.

Further details regarding voltages and algorithms used for driving an optical state transition for an electrochromic device may be found in U.S. patent application Ser. No. 13/049,623, titled "CONTROLLING TRANSITIONS IN OPTICALLY SWITCHABLE DEVICES," filed Mar. 16, 2011, which is herein incorporated by reference.

Figure 2:
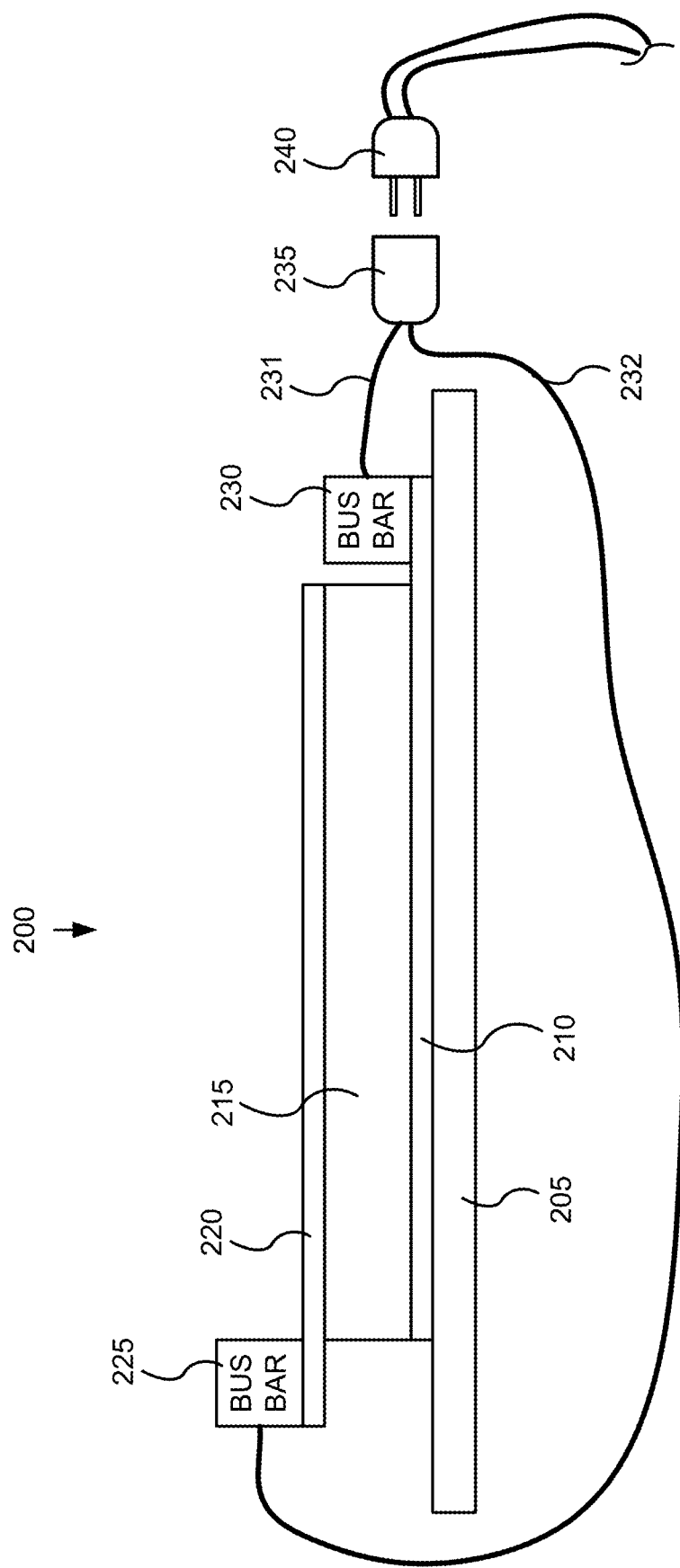
FIG. 2 is a cross-sectional schematic of an electrochromic device.

Along with voltage algorithms, there is associated wiring and connections for the electrochromic device being powered. FIG. 2 shows an example of a cross-sectional schematic of an electrochromic device, 200. Electrochromic device 200 includes a substrate, 205. The substrate may be transparent and may be made of, for example, glass. A first transparent conducting oxide (TCO) layer, 210, is on substrate 205, with first TCO layer 210 being the first of two conductive layers used to form the electrodes of electrochromic device 200. Electrochromic stack 215 may include (i) an electrochromic (EC) layer, (ii) an ion-conducting (IC) layer, and (iii) a counter electrode (CE) layer to form a stack in which the IC layer separates the EC layer and the CE layer. Electrochromic stack 215 is sandwiched between first TCO layer 210 and a second TCO layer, 220, TCO layer 220 being the second of two conductive layers used to form the electrodes of electrochromic device 200. First TCO layer 210 is in contact with a first bus bar, 230, and second TCO layer 220 is in contact with a second bus bar, 225. Wires, 231 and 232, are connected to bus bars 230 and 225, respectively, and form a wire assembly (not shown) which terminates in a connector, 235. Wires of another connector, 240, may be connected to a controller that is capable of effecting a transition of electrochromic device 200, e.g., from a first optical state to a second optical state. Connectors 235 and 240 may be coupled, such that the controller may drive the optical state transition for electrochromic device 200.

Further details regarding electrochromic devices may be found in U.S. patent application Ser. No. 12/645,111, titled "FABRICATION OF LOW DEFECTIVITY ELECTROCHROMIC DEVICES," filed Dec. 22, 2009. Further details regarding electrochromic devices may also be found in U.S. patent application Ser. No. 12/645,159 filed Dec. 22, 2009, U.S. patent application Ser. No. 12/772,055 filed Apr. 30, 2010, U.S. patent application Ser. No. 12/814,277 filed Jun. 11, 2010, and U.S. patent application Ser. No. 12/814,279 filed Jun. 11, 2010, each titled "ELECTROCHROMIC DEVICES;" each of the aforementioned are herein incorporated by reference.

Figure 3:
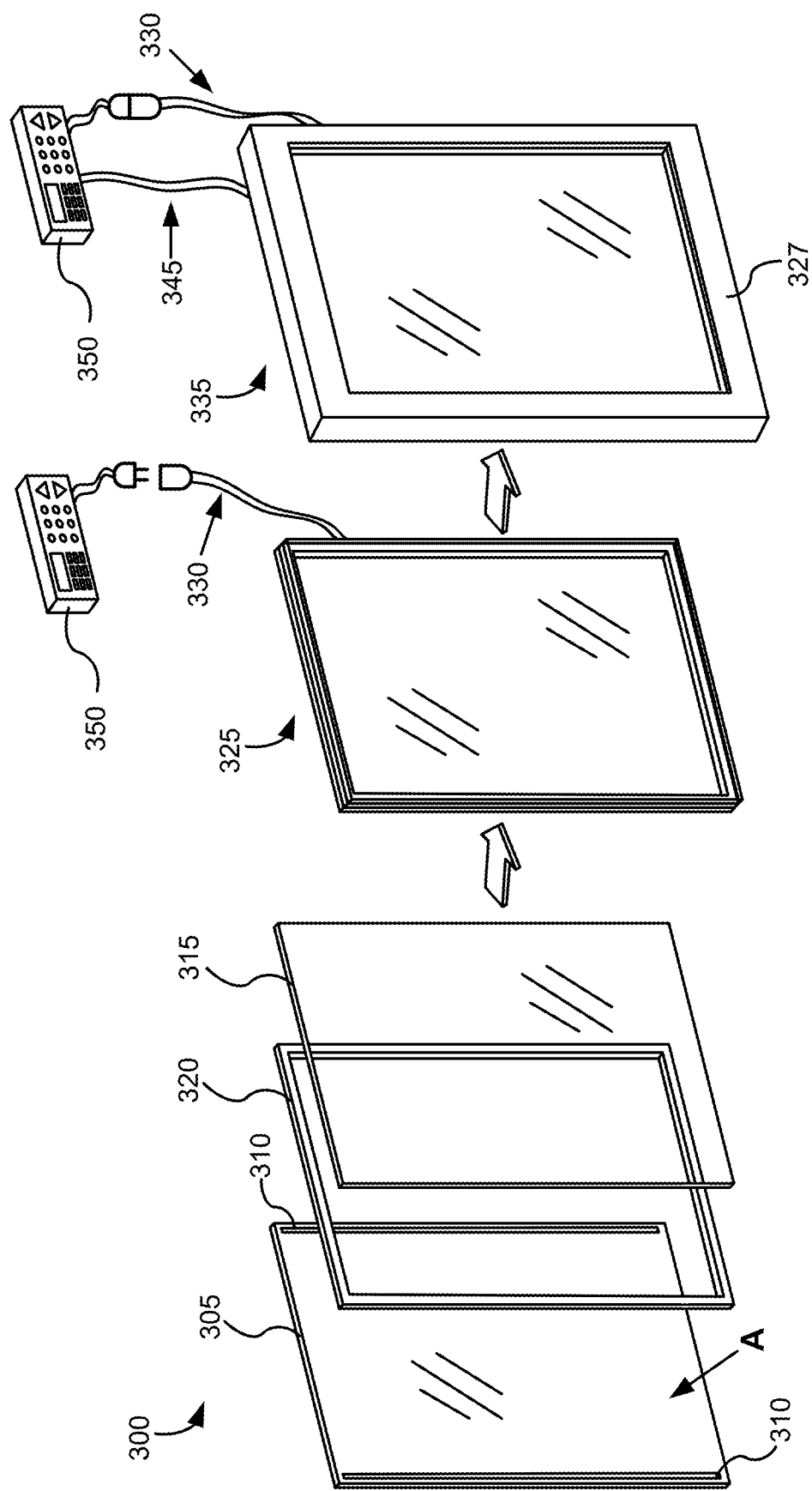
FIG. 3 shows examples of the operations for fabricating an insulated glass unit including an electrochromic pane and incorporating the insulated glass unit into a frame.

In accordance with voltage algorithms and associated wiring and connections for powering an electrochromic device, there are also aspects of how the wired EC glazing is incorporated into an IGU and how the IGU is incorporated into, e.g., a frame. FIG. 3 shows examples of the operations for fabricating an insulated glass unit, 325, including an electrochromic pane, 305, and incorporating the insulated glass unit into a frame, 327. Electrochromic pane 305 has an electrochromic device (not shown, but for example on surface A) and bus bars, 310, which provide power to the electrochromic device, is matched with another glass pane, 315. The electrochromic pane may include, for example, an electrochromic device similar to the electrochromic device shown in FIG. 2, as described above. In some embodiments, the electrochromic device is solid state and inorganic.

During fabrication of IGU 325, a separator, 320 is sandwiched in between and registered with glass panes 305 and 315. IGU 325 has an associated interior space defined by the faces of the glass panes in contact with separator 320 and the interior surfaces of the separator. Separator 320 may be a sealing separator, that is, the separator may include a spacer and sealing material (primary seal) between the spacer and each glass pane where the glass panes contact the separator. A sealing separator together with the primary seal may seal, e.g. hermetically, the interior volume enclosed by glass panes 305 and 315 and separator 320 and protect the interior volume from moisture and the like. Once glass panes 305 and 315 are coupled to separator 320, a secondary seal may be applied around the perimeter edges of IGU 325 in order to impart further sealing from the ambient environment, as well as further structural rigidity to IGU 325. The secondary seal may be a silicone based sealant, for example.

IGU 325 may be wired to a window controller, 350, via a wire assembly, 330. Wire assembly 330 includes wires electrically coupled to bus bars 310 and may include other wires for sensors or for other components of IGU 325. Insulated wires in a wire assembly may be braided and have an insulated cover over all of the wires, such that the multiple wires form a single cord or line. A wire assembly may also be referred to as a "pig-tail." IGU 325 may be mounted in frame 327 to create a window assembly, 335. Window assembly 335 is connected, via wire assembly 330, to window controller, 350. Window controller 350 may also be connected to one or more sensors in frame 327 with one or more communication lines, 345. During fabrication of IGU 325, care must be taken, e.g., due to the fact that glass panes may be fragile but also because wire assembly 330 extends beyond the IGU glass panes and may be damaged. An example of such a scenario is depicted in FIG. 4.

Figure 4:
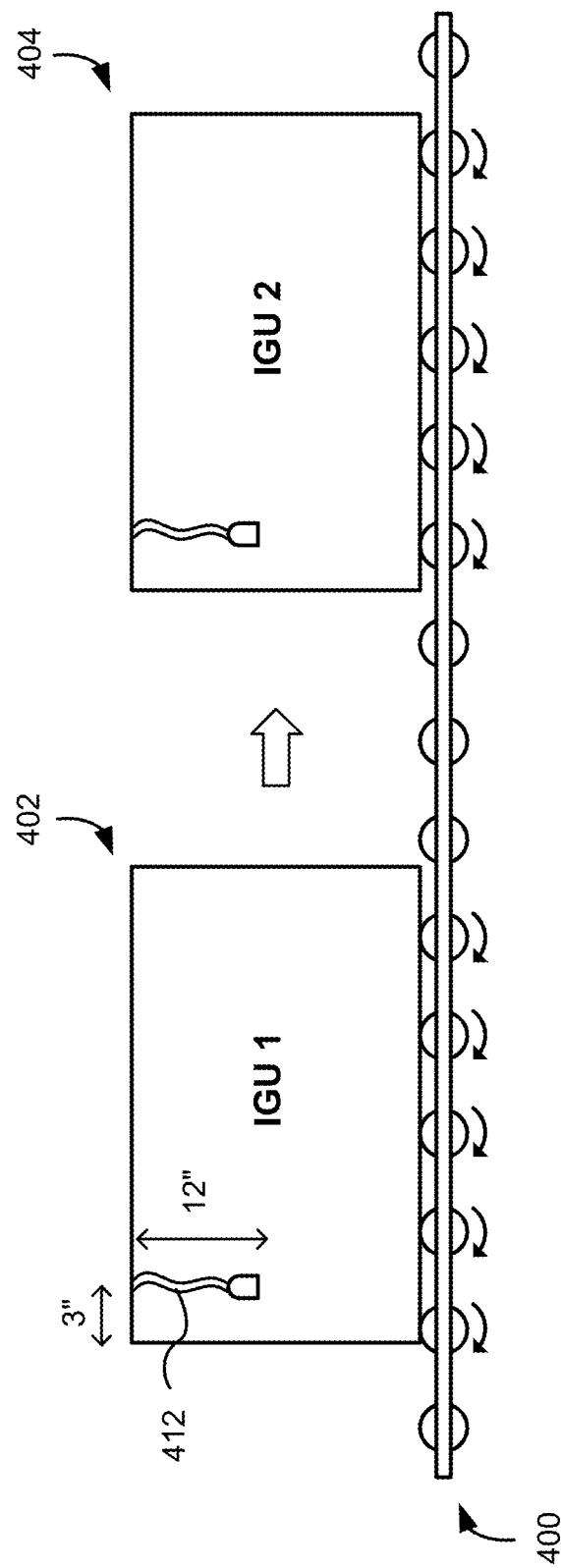
FIG. 4 shows an example of a manner in which an insulated glass unit including an electrochromic pane may be transported during fabrication and/or testing of the insulated glass unit.

FIG. 4 shows an example of the manner in which an insulated glass unit (IGU) including an electrochromic pane may be transported during the fabrication process for the insulated glass unit. As shown in FIG. 4, IGUs, 402 and 404, may be transported and handled on a transport system, 400, in a manner in which an IGU rests on its edge. For example, transport system 400 may include a number of rollers such that IGUs may easily be translated along an assembly or testing line. Handling an IGU in a vertical manner (i.e., with the IGU resting on its edge) may have the advantage of the IGU having a smaller footprint on a manufacturing floor. Each IGU may include a wire assembly (or a pigtail), 412, with a connector that provides electrical contact to the bus bars and the EC stack in each IGU. The wire assembly may be about 12 inches long such that the wire does not interfere with transport system 400, e.g., when the IGU vertical dimension as it rests on transport system 400 is about 12 inches or more. The wire assembly also may be offset from an edge of the IGU by about 3 inches, e.g., to ensure that when installed in a frame the wires do not interfere with blocks or other means of securing the IGU in the frame. During transport on transport system 400, the wire assembly, although sized to avoid contact with transport system 400, may catch on other features of a fabrication facility or be inadvertently held while the IGU is still moving along transport system 400. When the wire assembly is permanently attached to the IGU as shown in FIGS. 3 and 4, the wire assembly may be inadvertently detached from the IGU or otherwise damaged. This may include damaging the wiring within the secondary seal of the IGU. When this happens, the entire IGU may need to be replaced. Since typically the EC glazing(s) of the IGU are the most expensive feature, it is unacceptably costly to dispose of the entire IGU as a result of damaging the wiring component of the IGU assembly due to external portions of the wiring. Embodiments described herein avoid such a result.

Figure 5A:
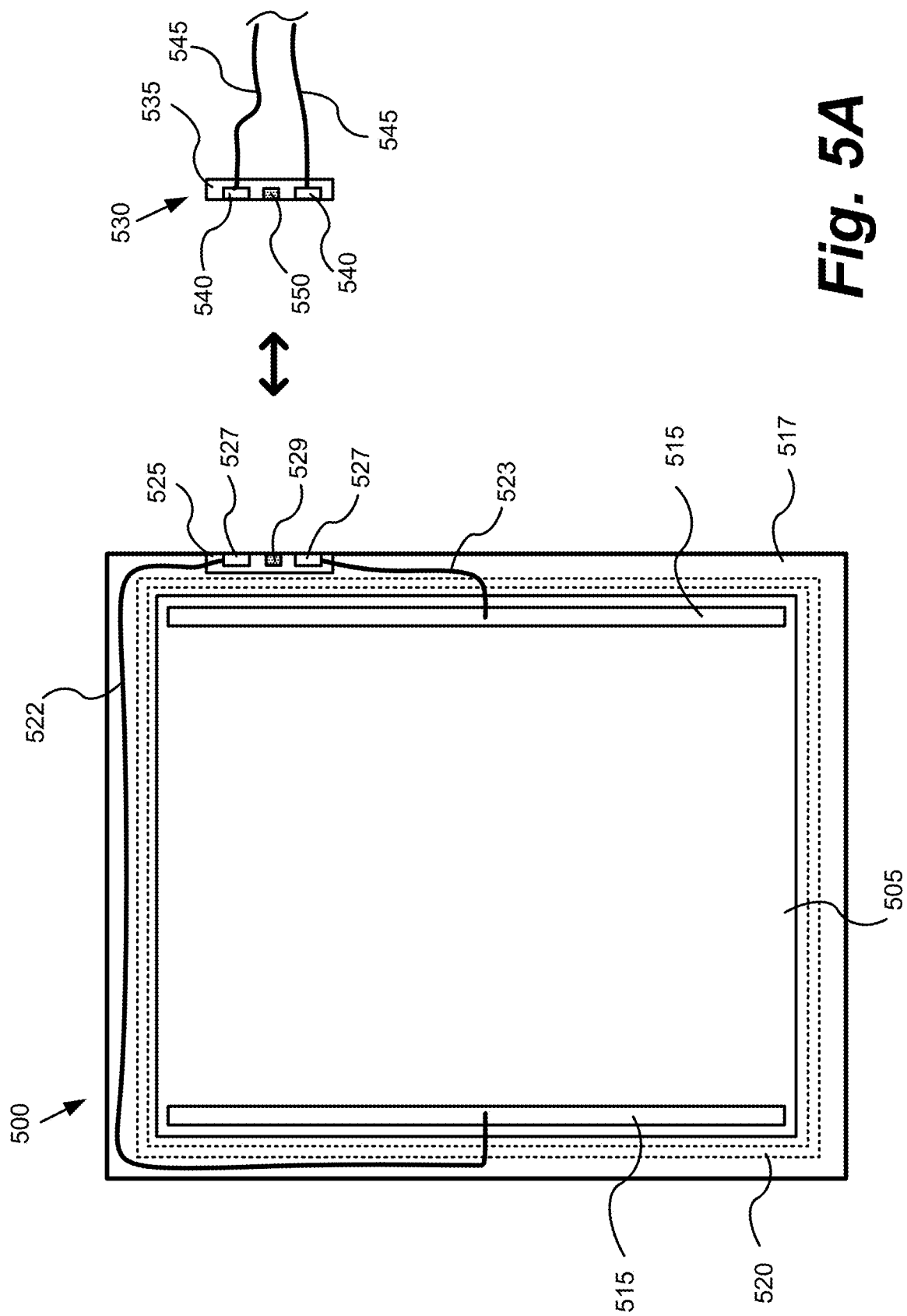
FIG. 5A is a schematic diagram of an insulated glass unit including an electrochromic pane and an associated wire assembly.

FIG. 5A is a schematic diagram of an insulated glass unit, 500, including an electrochromic pane, 505, and an associated wire assembly, 530. IGU 500 includes electrochromic pane 505 which includes bus bars, 515, which are in electrical communication with an EC device, 517 (for an exemplary cross-section see FIG. 2). Electrochromic pane 505 is matched with another pane (not shown) and attached to the other pane with a separator, 520 (indicated by the dotted lines). The area of EC pane 505 outside of separator 520 is a secondary sealing area, while EC device lies within the perimeter of separator 520 (which forms the primary seal against the glass panes of the IGU). In the assembled IGU, the secondary sealing area is typically filled with a sealing compound (as described in relation to FIG. 3) to form a secondary seal. Wires, 522 and 523, are connected to bus bars 515 and extend through IGU 500 from bus bars 515, through or under spacer 520, and within the secondary seal to a first connector, 525. Wires 522 and 523 may be positioned such that they do not appear in the viewable region of the panes. For example, the wires may be enclosed in the sealing separator or the secondary seal as depicted. In some embodiments, and as depicted, first connector 525 may be housed substantially within the secondary seal. For example, first connector 525 may be surrounded by the secondary sealant on all sides except for the face of first connector 525 having two pads, 527. The first connector may be housed substantially within the secondary seal in different manners. For example, in some embodiments, the first connector may be housed substantially within the secondary seal and be recessed relative to the edges of the glass panes. In some embodiments, the first connector may be housed substantially within the secondary seal and protrude beyond the edges of the glass panes. In other embodiments, first connector 525 may itself form part of the secondary seal, e.g., by sandwiching between the glass panes with sealant disposed between itself and the glass panes.

As noted above, first connector 525 includes two pads 527. The two pads are exposed and provide electrical contact to wires 522 and 523. In this example, first connector 525 further includes a ferromagnetic element, 529. Wire assembly 530 includes a second connector, 535, configured to mate with and provide electrical communication with pads 527. Second connector 535 includes a surface having two pads, 540, that provide electrical contact to wires, 545, of the wire assembly. Second connector 535 further includes a ferromagnetic element, 550, configured to register and mate with ferromagnetic element 529 of the first connector.

Pads 540 of second connector 535 are configured or shaped for mechanical and electrical contact with pads 527 of first connector 525. Further, at least one of ferromagnetic elements 529 or 550 of first connector 525 or second connector 535, respectively, may be magnetized. With at least one of ferromagnetic elements 529 or 550 being magnetized, first connector 525 and second connector 535 may magnetically engage one another and provide electrical communication between their respective pads. When both ferromagnetic elements are magnetized, their polarity is opposite so as not to repel each other when registered. A distal end (not shown) of the wire assembly 530 may include terminals, sometimes provided in a plug or socket, that allow the wire assembly to be connected to a window controller. In one embodiment, a distal end of wire assembly 530 include a floating connector, e.g., as described in relation to FIGS. 6 and 7.

In one embodiment, rather than a pad to pad contact (e.g., 527 to 540 as in FIG. 5A) for the first and second connectors, a pad to spring-type pin configuration is used. That is, one connector has a pad electrical connection and the other connector has a corresponding spring-type pin, or "pogo pin"; the spring-type pin engages with the pad of the other connector in order to make the electrical connection. In one embodiment, where ferromagnetic elements are also included, the magnetic attraction between the ferromagnetic elements of the first and second connectors is sufficiently strong so as to at least partially compress the spring mechanism of the pogo pin so as to make a good electrical connection when engaged. In one embodiment, the pads and corresponding pogo pins are themselves the ferromagnetic elements.

In some embodiments, first connector 525, second connector 535, or the terminals or connector at the distal end of the wire assembly (e.g. a floating connector) may include a memory device and/or an integrated circuit device. The memory device and/or integrated circuit device may store information for identifying and/or controlling electrochromic pane 505 in IGU 500. For example, the device may contain a voltage and current algorithm or voltage and current operating instructions for transitioning electrochromic pane 505 from a colored stated to a bleached state or vice versa. The algorithm or operating instructions may be specified for the size, shape, and thickness of electrochromic pane 505, for example. As another example, the device may contain information that identifies the shape or size of electrochromic pane 505 to a window controller such that electrochromic pane 505 may operate in an effective manner. As yet another example, the device may contain information specifying a maximum electric signal and a minimum electric signal that may be applied to electrochromic pane 505 by a window controller. Specifying maximum and minimum electric signals that may be applied to the electrochromic pane may help in preventing damage to the electrochromic pane.

In another example, the memory and/or integrated circuit device may contain cycling data for the EC device to which it is connected. In certain embodiments, the memory and/or integrated circuit device includes part of the control circuitry for the one or more EC devices of the IGU. In one embodiment, individually, the memory and/or integrated circuit device may contain information and/or logic to allow identification of the EC device architecture, glazing size, etc., as described above, e.g., during a testing or initial programming phase when in communication with a controller and/or programming device. In one embodiment, collectively, the memory and/or integrated circuit device may include at least part of the controller function of the IGU for an external device intended as a control interface of the installed IGU.

Further, in embodiments in which first connector 525 includes the memory device and/or the integrated circuit device, damage to the electrochromic pane may be prevented because the device is part of IGU 500. Having the maximum and minimum electric signals that may be applied to electrochromic pane 505 stored on a device included in first connector 525 means that this information will always be associated with IGU 500. In one example, a wiring assembly as described herein includes five wires and associated contacts; two of the wires are for delivering power to the electrodes of an EC device, and the remaining three wires are for data communication to the memory and/or integrated circuit device.

Wire assembly 530 described with respect to FIG. 5A may be easily attachable to, and detachable from, IGU 500. Wire assembly 530 also may aid in the fabrication and handling of an IGU because wire assembly 530 is not permanently attached to the IGU and will therefore not interfere with any fabrication processes. This may lower the manufacturing costs for an IGU. Further, as noted above, in some IGUs that include wire assemblies that are permanently attached to the IGU, if the wire assembly becomes damaged and/or separated from the IGU, the IGU may need to be disassembled to reconnect the wire assembly or the IGU may need to be replaced. With a detachable wire assembly, an IGU may be installed and then the wire assembly attached, possibly precluding any damage to the wire assembly. If a wire assembly is damaged, it can also be easily replaced because it is modular.

Additionally, the detachable wire assembly allows for the replacement or the upgrade of the wire assembly during the installed life of the associated IGU. For example, if the wire assembly includes a memory chip and/or a controller chip that becomes obsolete or otherwise needs replacing, a new version of the assembly with a new chip can be installed without interfering with the physical structure of the IGU to which it is to be associated. Further, different buildings may employ different controllers and/or connectors that each require their own special wire assembly connector (each of which, for example, may have a distinct mechanical connector design, electrical requirements, logic characteristics, etc.). Additionally, if a wire assembly wears out or becomes damaged during the installed life of the IGU, the wire assembly can be replaced without replacing the entire IGU.

Figure 5B:
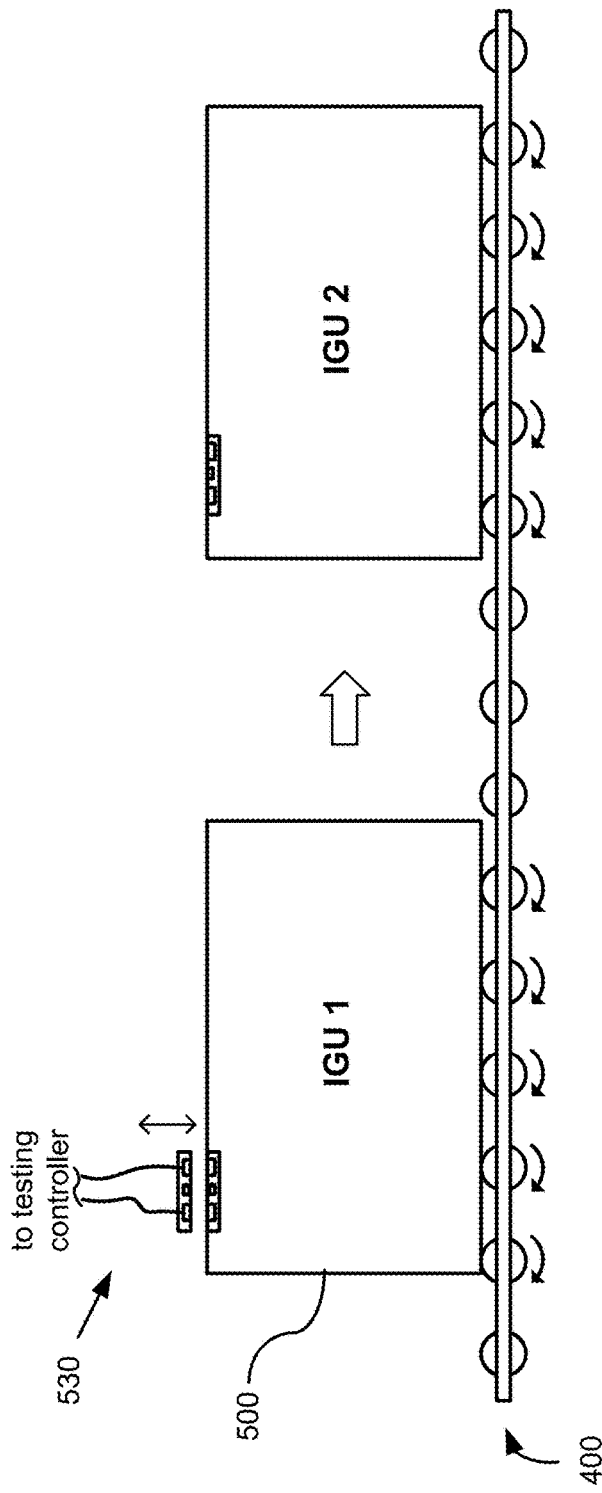
FIG. 5B shows an example of the manner in which an insulated glass unit including an electrochromic pane may be transported during fabrication and/or testing of the insulated glass unit.

Another advantage of a detachable wire assembly is shown in FIG. 5B. FIG. 5B is a schematic diagram of an insulated glass unit (IGU) including an electrochromic pane and an associated wire assembly on a transport system. The transport system 400 may include a number of rollers such that an IGU may easily be moved, as described above. The portion of transport system 400 shown in FIG. 5B may reside in a testing region of the manufacturing floor, for example, after the IGU is fabricated. With an IGU 500 including a connector and a wire assembly 530 with a connector capable of being magnetically coupled to one another as described in FIG. 5A, an IGU may be easily tested. For example, testing of the IGU may be performed automatically by dropping wire assembly 530 including a connector that includes a ferromagnetic element on to an edge of the IGU. The connector of the wire assembly may connect with the connector of the IGU, with little or no physical alignment needed, e.g., due to arrangement of one or more ferromagnetic elements in the mating connectors. For example, the testing connector end may simply be dangled near the IGU; the registration and connection between the connectors being accomplished by magnetic attraction and alignment, making it "snap" into place automatically. The IGU may then be tested, for example, by a testing controller coupled to the other end of the wire assembly. Testing may include, for example, activating the electrochromic pane and assessing the electrochromic pane for possible defects. The wire assembly may then be removed from the IGU by a force sufficient to overcome the magnetic attraction between the two connectors. In certain embodiments, the external connector may require appropriate flexible supports to prevent the wiring to the external connector from experiencing the stress of pulling the connectors apart. The wire assembly may then be ready to engage the next IGU moving along the manufacturing line.

In certain embodiments, each of the first and second connectors includes at least two ferromagnetic elements. In a specific embodiment, each of the first and second connectors includes two ferromagnetic elements. A "double" magnetic contact allows for more secure connections. Magnets such as neodymium based magnets, e.g., comprising $Nd_2Fe_{14}B$, are well suited for this purpose because of their relatively strong magnetic fields as compared to their size. As described above, the two ferromagnetic elements may be part of the electrical pads, or not. In one embodiment, the two ferromagnetic elements in each of the first and the second connectors are themselves magnets, where the poles of the magnets of each of the first and second connectors that are proximate when the connectors are registered, are opposite so that the respective magnets in each of the first and second connectors attract each other.

Figure 5C:
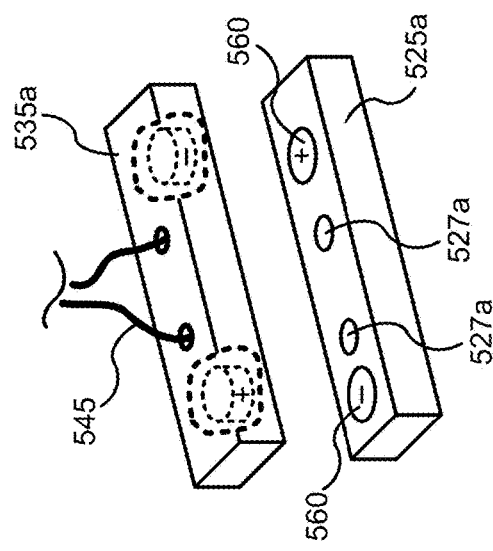
FIG. 5C depicts a first connector and second connector, each having two ferromagnetic elements.

FIG. 5C depicts a first connector (IGU and wiring to the first connector not shown), 525*a*, having two magnets, 560, one with the positive pole exposed and one with the negative pole exposed. The surfaces of electrical contacts, 527*a*, are also depicted. A second connector, 535*a*, has corresponding magnets where the poles facing the exposed poles of magnets 560 are opposite so as to attract magnets 560. Second connector also has wires, 545, that lead to a power source such as a controller (electrical pads on connector 535*a* are not depicted). Using such a connector configuration assures that the electrical connections (the pads in this example) will align correctly due to the magnetic poles attracting only when the opposite poles are proximate each other. In one embodiment, this arrangement is used where the pad-to-pad or pad-to-pogo-pin electrical connections are so magnetized and poles so configured.

Figure 5D:
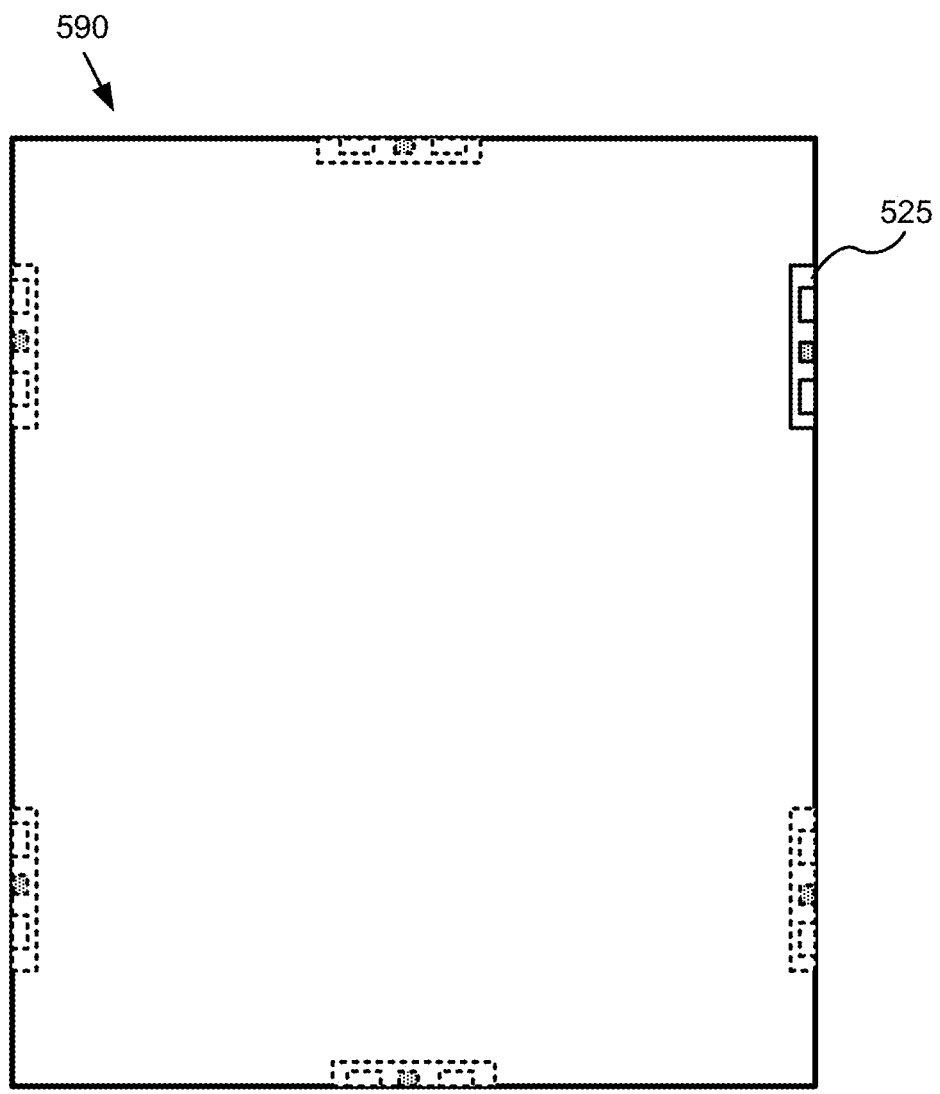
FIG. 5D depicts an IGU with two or more redundant connectors embedded in the secondary seal.

When installing an IGU in some framing systems, e.g., a window unit or curtain wall where multiple IGUs are to be installed in proximity, it is useful to have flexibility in where the electrical connection is made to each IGU. This is especially true since typically the EC glazing of the IGUs is always placed on the outside of the installation, facing the external environment of the installation. Given this configuration, having the connectors in the same position within the secondary seal of the IGUs of the installation requires much more wiring to the controller. However, for example, if the electrical connectors in the IGUs (as described herein) can be positioned more proximate to each other, then less wiring is needed from the IGU to the framing system in which the IGUs are installed. Thus, in some embodiments, IGU 500 may include more than one first connector 525, that is, redundant connectors are installed. For example, referring to FIG. 5D, an IGU 590 might include not only a first connector 525 at the upper right hand side, but also (as indicated by the dotted line features) another connector at the lower left hand side or at the lower right hand side or the upper left hand side or in the top or bottom portion of the IGU. In this example, the connectors are all within the secondary seal. The exact position on each edge is not critical; the key is having more than one connector that feeds the same EC device so that when installing the IGU, there is flexibility in where to attach the external connector to the IGU. When IGU 590 is mounted in a frame holding 2, 4, 6, or more IGUs similar to IGU 590, for example, having multiple first connectors included within each IGU 590 allows for more convenient routing of the wires (e.g., wires 545 as in FIG. 5A associated with each wire assembly 530) in the frame due to the flexibility of having multiple redundant first connectors to which the second connector may be coupled. In one embodiment, the IGU has two first connectors, in another embodiment three first connectors, in yet another embodiment four first connectors. In certain embodiments there may be five or six first connectors. Although the number of connectors may impact production costs, this factor may be more than compensated for by the higher degree of flexibility in installation, e.g., in an expensive and sophisticated curtain wall installation where volume to accommodate wiring is often limited and installing multiple first connectors during fabrication is relatively easy.

In some embodiments, the IGU, e.g. 500 or 590, may include two electrochromic panes. In these embodiments, the first connector may include four pads (or corresponding pad to pin contacts) to provide contacts to the bus bars of each of the electrochromic panes (i.e., each electrochromic pane would include at least two bus bars). Additional pads for control and communication with the electrochromic device and/or onboard controller may also be included, e.g., four pads for bus bar wiring and three additional pads for communication purposes. Likewise, second connector 535 would include four pads to provide electrical contact to wires of the wire assembly. In other embodiments, each EC pane may have its own first connector, or two or more redundant first connectors. Further description of an IGU that includes two or more electrochromic panes is given in U.S. patent application Ser. No. 12/851,514, titled "MULTI-PANE ELECTROCHROMIC WINDOWS," filed Aug. 5, 2010, which is herein incorporated by reference.

Certain embodiments include connectors that are external to the IGU and provide electrical communication from a framing structure to the IGU (either directly wired to the IGU or wired to a first and second connector assembly as described above). FIG. 6 shows examples of schematic diagrams of a window assembly, 600, including an insulated glass unit (IGU), 610, which includes an electrochromic pane. IGU 610 resides in a frame, 605. A connector, 620, is wired to IGU 610, and as installed attached to a frame 605; at least part of connector 620 (the nose, infra) passes through an aperture in frame 605. FIG. 6 includes a top-down schematic diagram (top left, looking at window assembly 600 from a major face, but with some aspects missing so as to show internal detail of the assembly) as well as a cross-section (bottom left) B of window assembly 600. The cross-section B is indicated by cut B on the top-down diagram. Dashed line 607 indicates the front edge of frame 605 (behind the IGU as depicted); the portion of IGU 610 within dashed line 607 corresponds to the viewable area of IGU 610 that one would see when the frame is assembled, i.e., that which would function as the window. Glazing blocks 615 between IGU 610 and frame 605 serve to support IGU 610 within frame 605. Glazing blocks 615 may be compliant to account for differences in the coefficients of thermal expansion between frame 605 and IGU 610. For example, the glazing blocks 615 may be a foam material or a polymeric material. Framing material, 625, holds IGU 610 against frame 605. Note that framing material 625 is not shown in the top-down schematic of window assembly 600. Note also that IGU 610 may be in contact with frame 605 and framing material 625 on each face, respectively, as shown but there may also be some sealant between the glass and the framing material. The cross section shows that this IGU contains two glazings separated by spacers.

IGU 610 includes a wire assembly 617 including at least two wires electrically coupled to the two bus bars (not shown) of an electrochromic device (not shown) on the electrochromic pane of the IGU. Note that wire assembly 617 is not shown in the cross section of window assembly 600. The wires of wire assembly 617 terminate at a floating connector 620 at a distal end of the wire assembly. Floating connector 620 includes two female sockets that are electrically coupled to the wires. Further details regarding embodiments of floating connectors are given below with respect to FIG. 7. A fixed connector, 630, including two male pins may be plugged into floating connector 620. The fixed connector may be fixed to a frame or building in which window assembly 600 is mounted, for example. With fixed connector 630 being electrically coupled to a window controller, the optical state of the electrochromic device of IGU 610 may be changed.

While floating connector 620 and fixed connector 630 as shown in FIG. 6 are pin/socket type connectors, other types of connectors may be used. For example, in some embodiments, a face of the nose of the floating connector may be flat and include magnetic pads presented on the face of the floating connector. Wires of wire assembly 617 may be coupled to these magnetic pads. Fixed connector 630 may also include magnetic pads that are configured or shaped for mechanical and electrical contact with the pads of the floating connector. Alternatively, floating connector 620 and fixed connector 630 may be similar to the connectors described above in relation to FIG. 5A.

Floating connector 620 may be attached to frame 605 with screws, nails, or other devices, or may be a compression fit with no additional affixing members. A nose of the floating connector may be flush with the outer edge of frame 605. The nose of the floating connector may be circular, rectangular, or other shape.

While wire assembly 617 is shown as being directly connected to floating connector 620, other mechanisms may be used to connect wire assembly 617 to floating connector 620. For example, in some embodiments, the connection of wire assembly 617 to floating connector 620 may be made with connectors similar to the connectors described above in relation to FIG. 5A.

Further, similar to the connectors and the wire assembly described in FIG. 5A, floating connector 620, fixed connector 630, or the distal end of the wire assembly, of which the fixed connector 630 is a part, may include a memory device and/or an integrated circuit device. The device may store information for identifying and/or controlling the electrochromic pane in IGU 610, as described above.

In some embodiments, IGU 610 may include two electrochromic panes. In this embodiment, the floating connector may include four female sockets that are electrically coupled to the bus bars of each of the electrochromic panes (i.e., each electrochromic pane would include at least two bus bars). Likewise, fixed connector 630 would include four male pins to be plugged into the floating connector.

Figure 7:
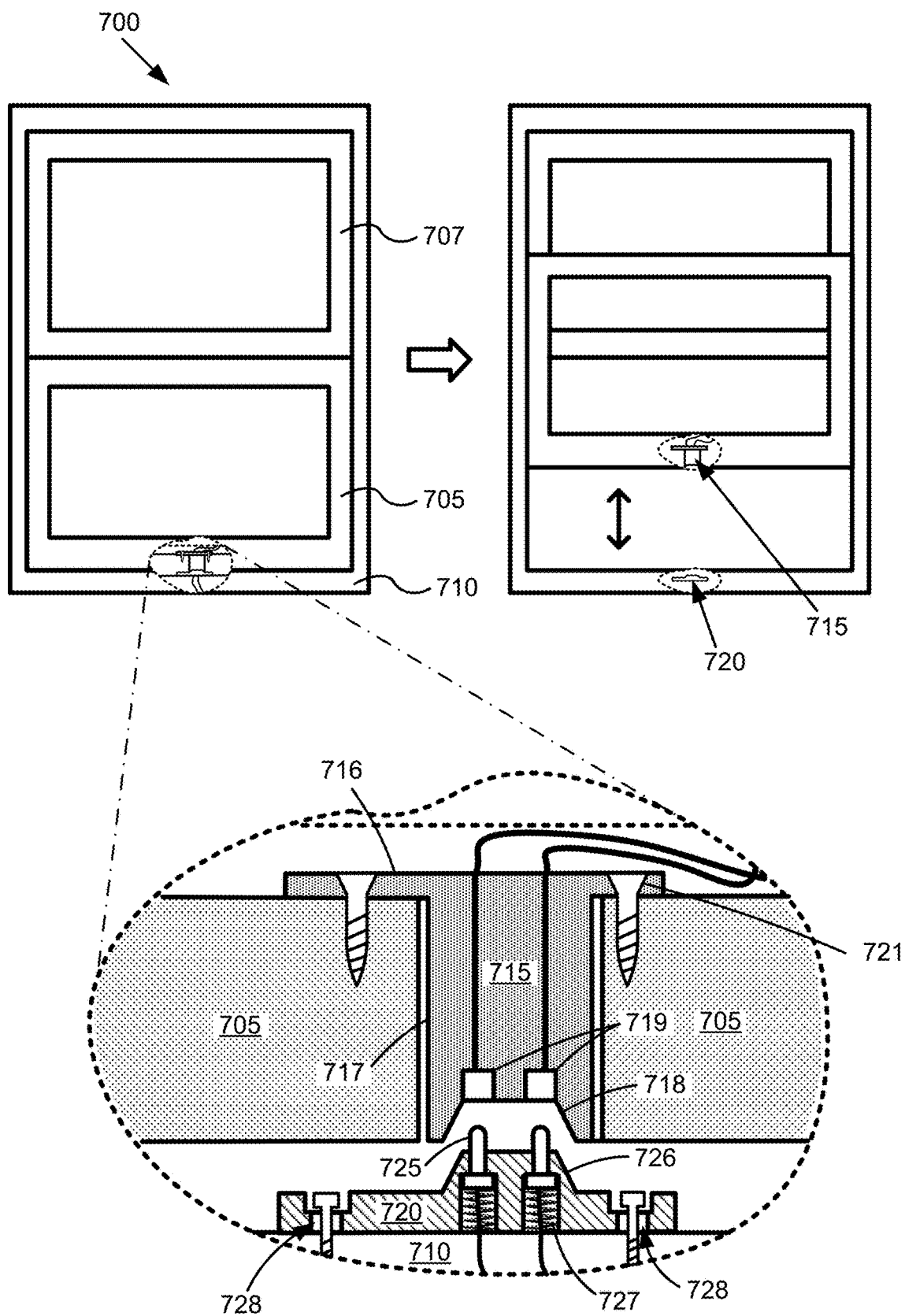
FIG. 7 shows examples of schematic diagrams of a window unit incorporating an insulated glass unit including an electrochromic pane with detail of a connection configuration for powering the insulated glass unit.

FIG. 7 shows examples of schematic diagrams of a window unit, 700, incorporating an insulated glass unit including an electrochromic pane. Window unit 700 includes a frame, 710, in which a fixed frame, 707, and a movable frame, 705, are mounted. Fixed frame 707 may be fixedly mounted in frame 710 so that it does not move. Movable frame 705 may be movably mounted in frame 710 so that it may move from a closed position to an open position, for example. In the window industry, the window unit may be referred to as a single hung window, the fixed frame may be referred to as a fixed sash, and the movable frame may be referred to as a movable sash. Movable frame 705 may include an IGU (not shown) including an electrochromic pane (not shown), with connection of the electrochromic pane to a window controller being provided by a floating connector, 715, and a fixed connector, 720. While FIG. 7 shows a window unit including one movable frame with connectors for connecting the electrochromic pane of the movable frame to a window controller, the connectors also may be used with a window unit including two movable frames. Also, one of ordinary skill in the art would appreciate that the described embodiments with one or two movable frames could include horizontally-sliding windows.

When movable frame 705 is in an open position, floating connector 715, affixed to the movable frame 705, may not be in contact with fixed connector 720, which is affixed to the frame 710. Thus, when movable frame 705 is in an open position, the electrochromic pane of the IGU mounted in movable frame 705 may not be able to be controlled by a window controller. When movable frame 705 is in a closed position, however, floating connector 715 makes contact with fixed connector 720. The mating of floating connector 715 and fixed connector 720 provides electrical communication, and thus allows for actuation of the electrochromic pane of the IGU in movable frame 705. For example, the fixed connector may be coupled to a window controller, with the window controller being configured to transition the electrochromic pane of the IGU between a first optical state and a second optical state.

Floating connector 715 and fixed connector 720 are one example of a pair of connectors for electrically coupling an electrochromic pane to a window controller. Other pairs of connectors are possible. Floating connector 715 has a flange, 716, and a nose, 717, extending from the flange. Nose 717 may have a length about equal to a thickness of movable frame 705. Nose 717 includes a terminal face, 718, that includes two exposed female contacts, 719. Floating connector 715 may be affixed to movable frame 715 through mounting holes 721 in the flange 716 using screws, nails, or other attachment devices and/or press fit (i.e., secured by compression only). Because female contacts 719 of floating connector 715 may have opposite polarities, both floating connector 715 and fixed connector 720 may have offset mounting holes and/or be shaped or configured so that they can be installed in only one way, e.g., having an asymmetrical element associated with the shape of the connector and/or a registration notch or pin. That is, for example, one mounting hole 721 in flange 716 may be located closer to nose 717 than another mounting hole 721. With the mounting holes arranged in this offset manner, the exposed contacts may be arranged in a defined orientation when floating connector 715 is affixed to movable frame 705. For example, movable frame 705 may include holes that are drilled or formed in the movable frame when it is made. When installing the IGU in the movable frame, one may mount floating connector 715 in movable frame 705 such that offset holes 721 in flange 716 are arranged to match the holes pre-formed in movable frame 705. This offset arrangement of mounting elements prevents the IGU from being connected to a window controller incorrectly, which may damage the electrochromic pane of the IGU.

Another mechanism instead of, or in addition to, screws or nails may be used to affix floating connector 715 to movable frame 705. For example, in some implementations, nose 717 of floating connector 715 may further include protrusions. Such protrusions may engage with movable frame 705 and hold nose 717 of floating connector 715 when the nose is passed through a hole or an aperture in the movable frame to expose terminal face 718 of nose 717. In some implementations, the protrusions from nose 717 may be incompressible. The incompressible protrusions may engage with and deform the inside of the hole or aperture in movable frame 705 when nose 717 is passed through the hole during installation (e.g., the nose is partially inserted into the hole and then the remainder of the nose tapped in with a rubber mallet). When the incompressible protrusions engage with and deform inside the hole, they may hold floating connecter 715 in movable frame 705. In one example, the protrusions are barbs or similar "one-way" protrusions that are configured to hold the nose in the aperture once inserted therein. In another example, the protrusions, although incompressible and configured to hold the nose in the aperture, allow the nose to be removed with some amount of force that will not damage the connector. In other implementations, the protrusions from nose 717 may be compressible. The compressible protrusions may compressively engage with the inside of a hole or an aperture in movable frame 705 when nose 717 is inserted into the hole. When the compressible protrusions engage with the hole, they may hold floating connecter 715 in movable frame 705.

Fixed connector 720 includes two male contacts 725. When movable frame 705 is in a closed position, male contacts 725 of fixed connector 720 contact the two female contacts 719 of floating connector 715. This allows electrical communication with the electrochromic pane in movable frame 705. Springs 727 or other mechanical devices are used to cause male contacts 725 to extend from the raised surface 726 of fixed connector 720. Springs 727 or other mechanical devices also allow male contacts 725 to recede into raised surface 726 of fixed connector 720 when a force is applied to male contacts 725. Springs 727 in fixed connector 720 may aid in protecting male contacts 725 during use of window unit 700. For example, without springs 727, male contacts 725 may be exposed and otherwise damaged by a user opening and closing the window in some cases. Male contacts 725 are one type of pogo pin electrical contact.

In some embodiments, terminal face 718 of floating connector 715 may include a circumferential rim and an interior recessed region where exposed female contacts 719 are presented. The circumferential rim may have a slope directed inwardly towards the interior recessed region. The inwardly directed slope of the circumferential rim may facilitate mating of raised surface 726 of fixed connector 720 with terminal face 718 of floating connector 715. Raised surface 726 may aid in guiding male contacts 725 of fixed connector 720 to register with female contacts 719 of floating connector 715.

Similar to floating connector 715, fixed connector 720 may be affixed to frame 710 through mounting holes 728 in fixed connector 720 using screws, nails, or other attachment devices. Fixed connector 720 also may have offset mounting holes. That is, for example, one mounting hole, 728, in fixed connector 720 may be located closer to raised surface 726 than another mounting hole, 728. With the mounting holes arranged in this offset manner, male contacts 725 may be arranged in a defined orientation when fixed connector 720 is affixed to frame 710. For example, frame 710 may include holes that are drilled or formed in the frame when it is made. An installer of fixed connector 720 in frame 710 may mount the fixed connector to the frame such that offset holes 728 are arranged to match the holes formed in the frame. This prevents the IGU from being connected to a window controller incorrectly, which may damage the electrochromic pane of the IGU.

In this example, mounting holes 728 in fixed connector 720 also allow for movement of fixed connector 720, that is, fixed connector 720 is movably affixed to frame 710. For example, each of mounting holes 728 includes an open volume around the screw that passes through it. This open volume may be a slot that allows fixed connector 720 to translate orthogonally (in the plane of the page as drawn) to the motion of movable frame 705 in order to align with floating connector 715 when movable frame 715 moves towards a closed position and thereby connectors 715 and 720 "dock" with each other. The slot is sized so that the heads of the attaching screws cannot pass through the slots, thus fixed connector 720 is "slidably" attached to frame 710.

Fixed frame 707 of window unit 700 also may include an IGU (not shown) including an electrochromic pane (not shown). Connectors, such as connectors 715 and 720 described above, may be used to connect the electrochromic pane of fixed frame 707 to a window controller. A fixed connector having springs 727, or other mechanical devices that may protect the male contacts 725, may not need to be used in the connectors for fixed frame 707, however, as fixed frame 707 may remain fixed and not move from an open position to a closed position.

In some embodiments of a fixed connector and a floating connector for a movable frame mounted in a frame, springs or other mechanisms are not used to cause male contacts 725 to extend from raised surface 726 of fixed connector 720. Instead, for example, a magnetic force is used to cause male contacts 725 of fixed connector 720 to couple with female contacts 719 of floating connector 715. The magnetic force may be provided by either or both of female contacts 719 in floating connector 715 and/or male contacts 725 in fixed connector 720 including magnetic elements, for example. The magnetic elements may be neodymium magnets, for example. A magnetic force between male contacts 725 and female contacts 719 causes male contacts 725 to extend from raised surface 726 and couple to female contacts 719 in floating connector 715 when floating connector 715 and fixed connector 720 are in close proximity to one another. When fixed connector 720 and floating connector 715 are a distance apart from one another, a mechanical device may impart a force on male contacts 725 that causes male contacts 725 to recede into the fixed connector 720, for example, springs that cause male contacts 725 to recede into fixed connector 720 when the magnetic force is sufficiently diminished by separation of fixed connector 720 and floating connector 715.

It should be noted that, as described thus far, when movable frame 705 of window unit 700 is closed, electrical contact is made via the contacts as described. In one embodiment, the movable frame containing the IGU and the frame in which the movable frame resides have a wireless power generator and receiver. In this way, the electrochromic pane can be transitioned even if the movable frame is in an open position. It is convenient to have the wireless power generator in the frame and the receiver in the movable frame containing the IGU and the electrochromic pane, but embodiments are not so limited. Wireless powered electrochromic windows are described in U.S. patent application Ser. No. 12/971,576, filed Dec. 17, 2010, titled "Wireless Powered Electrochromic Windows," which is hereby incorporated by reference. In one embodiment, the frame contains a radio frequency (RF) generator for transmitting wireless power and the movable frame contains a receiver for transforming the wirelessly transmitted energy into electrical energy to power the electrochromic pane. In another embodiment, one or more wireless power generators are located away from the electrochromic pane while the receiver is in the movable frame. In other embodiments, magnetic induction is used to generate wireless power for the electrochromic pane.

In other embodiments, continuous electrical contact between a frame and a movable frame mounted in the frame is made via connectors with sliding contacts. FIG. 8 includes schematic diagrams of a window unit, 800, which includes insulated glass units each including an electrochromic pane. FIG. 8, like FIG. 6, includes a front view and a cross section of the window unit 800. Cross-section C (lower portion of FIG. 8) is indicated by line C on the front view in the upper left portion of FIG. 8.

Window unit 800 includes a frame, 810, in which a first movable frame, 805, and a second movable frame, 807, are mounted. First movable frame 805 and second movable frame 807 are movably mounted in frame 810 so that they both may move up and down in frame 810. In the window industry, window unit 800 may be referred to as a double hung window and movable frames 805 and 807 are referred to as movable sashes. First movable frame 805 includes an IGU, 815, including an electrochromic pane (not shown). Second movable frame, 807, includes an IGU 817 including an electrochromic pane (not shown).

To provide electrical connections to the electrochromic panes in each of IGUs 815 and 817, frame 810 includes rails (e.g., two rails for each of movable frames 805 and 807, and additional rails for communication to onboard circuitry if included in the IGU) that are electrically coupled to a window controller when the sashes are installed in frame 810. In this example, each of IGUs 815 and 817 include a floating connector, 825, that electrically connects the bus bars (not shown) of the electrochromic panes to connector pins 835 mounted in movable frames 805 and 807, respectively. Springs 830 or other mechanisms may be associated with connector pins 835 to force connector pins 835 into contact with rails 820 when movable frames 805 and 807 are mounted in frame 810. Note that rails 820 need not, and in this example do not, traverse the entire height of frame 810. This is due to the positioning of connectors 825 mounted in movable frames 805 and 807. By virtue of this placement, electrical connection between pins 835 and rails 820 is maintained throughout the entire slidable range of the movable frames. In some embodiments, rails 820 traverse the entire height of the frame 810, depending on the positioning of connectors 825 in each of the movable frames 805 and 807.

In some embodiments, rails 820 may be a metal. In other embodiments, rails 820 may be carbon or other conductive material, e.g., carbon brushes or woven carbon fibers, e.g., in the form of a compressible tube. In some embodiments, connector pins 835 may be a metal or carbon. Connector pins 835 may also be in the form of brushes. In some embodiments, the interface between rails 820 and connector pins 835 may serve as a weather seal. Further, the motion of movable frames 805 and 807 in frame 810 may serve to clean the surfaces where rails 820 contact connector pins 835 so that electrical contact may be maintained.

Other configurations of rails 820 and connector pins 835 are possible. For example, the rails may be positioned at 837 where a movable frame contacts frame 810. Pins 835 or other conductive surface may be arranged to contact rails 820 positioned at 837.

While FIG. 8 shows a window unit including two movable frames with connectors for connecting the electrochromic panes of the movable frames to a window controller, the connectors also may be used with a window unit including one movable frame or horizontally sliding windows.

In some embodiments of IGU 815 or 817, the IGU may include two electrochromic panes. In this embodiment, to provide electrical connections to the electrochromic panes in each of IGUs 815 and 817, frame 810 may include rails (e.g., four rails for each of the moveable frames 805 and 807, as each electrochromic pane would include at least two bus bars). The rails in the frame may be electrically coupled to a window controller. In one embodiment, the four rails for each movable frame are configured as two pairs, each pair on opposite sides of the movable frame so as to avoid contact due to any play the movable frame may have in the frame in which it resides. In another embodiment, the four (or more) rails associated with each IGU are on the same side of the movable frame, substantially parallel but spaced apart sufficiently so as to avoid contact with another rail's floating connector contacts. Another way to maintain continuous electrical communication between a movable frame mounted in a frame is by direct wiring. Embodiments described herein use flexible wiring, e.g. ribbon cable, to make the electrical connections.

Figure 9A:
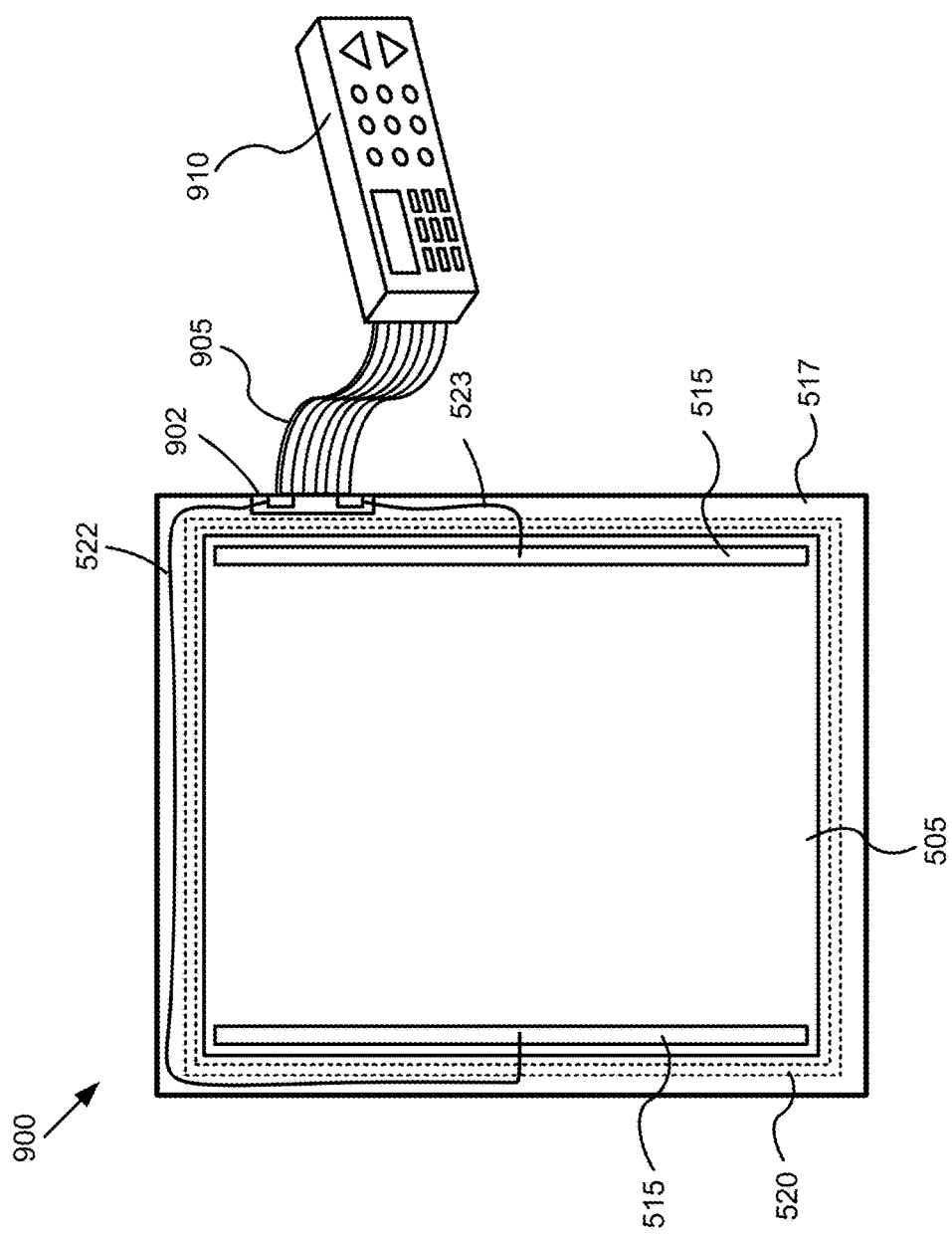

FIG. 9A shows a schematic diagram of an insulated glass unit including an electrochromic pane and an associated ribbon cable. The IGU 900 includes an electrochromic pane, 505, having bus bars, 515, which are in electrical communication with an EC device, 517 (for an exemplary cross-section see FIG. 2). Electrochromic pane 505 is matched with another pane (not shown) and attached to the other pane with a separator, 520 (indicated by the dotted lines). Outside of separator 520 is a secondary sealing area. Wires 522 and 523 are connected to bus bars 515 and extend through IGU 900 to a connector, 902. Connector 902 is capable of being connected to a ribbon cable, 905. Ribbon cable 905 may be connected to a window controller, 910. In some embodiments, the ribbon cable may be a cable with many conducting wires running parallel to each other on the same plane. The ends of the ribbon cable may include connectors for connecting to connector 902 and to window controller 910.

In some embodiments, connector 902 may be similar to connector 525 (i.e., connector 902 may include one or more ferromagnetic elements) and ribbon cable 905 also may include one or more ferromagnetic elements for engaging connector 902 with ribbon cable 905. Other mechanisms also may be used to engage connector 902 with ribbon cable 905.

In some embodiments, connector 902 may include a memory device and/or an integrated circuit device. Ribbon cable 905 may include more wires or electrically conductive paths than the two paths needed to electrically connect to bus bars 515 of electrochromic pane 505 so that the window controller can communicate with the memory device and/or the integrated circuit device. In some embodiments, the ribbon cable may have electrically conductive paths for controlling more than one electrochromic pane, as described below. Ribbon cables have advantages including the capability of having multiple parallel wires for carrying power, communication signals etc., in a thin, flexible format.

In some embodiments, IGU 900 includes two or more electrochromic panes. Connector 902 may be capable of providing electrical contact to the bus bars of each of the electrochromic panes (i.e., each electrochromic pane would include at least two bus bars). Thus, in the example of an IGU having two electrochromic panes, the ribbon cable may include four conducting wires running parallel to each other on the same plane for powering the electrochromic panes.

As described above, in certain embodiments, an IGU may include more than one connector. In one embodiment, a second connector or further connectors are redundant and serve the same function as the first connector, such as for facilitating installation of the IGU by providing more flexibility in wiring configurations to the IGU. In other embodiments, the second or further connectors are for connecting the IGU to other IGUs in series or in parallel. In one example, the IGUs are linked via connectors and wiring assemblies in order to function, for example, independently, according to the commands of a single controller. The controller may also include capability to control physical movement of one or more of the IGUs via a movement mechanism. The movement mechanism can include, e.g., components to open or close a window which includes an IGU, and/or components for positioning a folding assembly containing two or more IGUs in windows and/or doors. An illustration of this depicted in FIG. 9B, which shows a system including a plurality of IGUs, in this case four IGUs, 900*a-d*, incorporated into a folding door system, 903. In this example, system 903 includes four doors, each containing an IGU, 900*a-d*, respectively. The system could include more or less doors and/or IGU's and may include windows as well as doors. The IGUs of system 903 are each independently controlled by a controller 910, e.g., as indicated in FIG. 9B by IGU 900*b* being in a colored state while IGUs 900*a*, 900*c*, and 900*d* are transitioned to a bleached state.

System 903 may be used, for example, in a large conference room as an optional divider when the room is to be bifurcated into two smaller conference rooms. As indicated in the top view (FIG. 9B, lower schematic) the doors containing IGUs 900*a-d* are hinged in order to fold in an accordion fashion and also to translate (as indicated by the heavy dashed arrow), e.g., into a recess in a wall for storage. In this example, controller 910 controls not only the independent transitioning of IGUs 900*a-d*, but also the folding/unfolding of the doors as well as the translation of the doors into the storage position. The mechanism(s) for folding and translating the doors is not depicted in FIG. 9B; however, one of ordinary skill in the art would appreciate that such mechanisms are commercially available and well known. The mechanisms may include components that require powering via one or more of the doors, and thus the electrical communication in such instances may pass through wiring assemblies 905 and thus, IGUs 900*a-d*, but this is not necessary. In some embodiments, a controller controls not only the transition of an EC device (i.e., the EC device associated with an IGU), but also, independently, an associated movement of the IGU via a movement mechanism.

Controller 910 can accept input manually as depicted and/or wirelessly. Controller 910 is in electrical communication with each of IGUs 900*a-d* via ribbon cable assemblies, 905. In this example, each of IGUs 900*b*-900*d* has two connectors, e.g., IGU 900*d* is connected both to controller 910 and to IGU 900*c* via ribbon cables 905 and corresponding connectors in IGU 900*d*. In turn, each of IGUs 900*b* and 900*c* also contain two connectors to which ribbon cables 905 are connected in order to continue the chain of electrical communication. The IGU 900*a* has at least one connector in order to electrically connect to IGU 900*b* via ribbon cable 905. The IGU 900*a* may also have additional connectors, e.g., if it is convenient to produce IGU 900*a* in the same manner as IGUs 900*b-d*, but this is optional, as in this example IGU 900*a* need only have one associated connector.

In this example, independent control of the electrochromic panes in IGUs 900*a-d* is accomplished by connecting the IGUs to the window controller in series. Each of ribbon cables 905 has an appropriate number of wires and associated contacts to accommodate electrical communication, and thus independent control, from controller 910. The ribbon cable may include any number of different wires, depending on the IGUs to be controlled, the window controller specifications, the manner in which the IGUs are coupled and, optionally, sensors and also any associated movement mechanisms that must be controlled via the electrical communication lines through the IGUs. In some embodiments, the ribbon cable may include 4, 8, 18, 24, or even more wires. For example, the ribbon cable may include two wires if a number of IGUs are coupled to one another in series and there are not any sensors associated with the IGUs. As another example, the ribbon cable may include four wires if two IGUs are coupled to one another and both IGUs are directly coupled to a window controller.

FIG. 9C shows an example of a window unit incorporating an insulated glass unit including an electrochromic pane. The window unit, 915, includes a frame, 920, in which a movable frame, 925, which holds an IGU 900, is mounted. Movable frame 925 may be movably mounted in frame 920 so that it may rotate along an axis of rotation, 917, from a closed position to an open position, for example. In the window industry, window unit 915 may be referred to as a casement window and movable frame 920 may be referred to as a hinged sash. Movable frame 925 may include IGU 900 including an electrochromic pane (not shown), with connection of the electrochromic pane to a window controller being provided through a ribbon cable 905. Ribbon cable 905 may allow for rotation of movable frame 925 with respect to frame 920. A controller controls not only the optical transitions of IGU 900, but also, optionally, controls a movement mechanism for the window to open and close and related intermediate positioning.

Ribbon cable 905 may include two male connectors, 907 and 909, for coupling IGU 900 in movable frame 925 to a window controller coupled to frame 920. Many different types of connectors may be used for the ribbon cable, however. For example, in some other embodiments, the ribbon cable may include a male connector and a female connector, two female connectors, and/or a connector including one or more ferromagnetic elements as described herein.

In some embodiments, the ribbon cable may be a commercially available ribbon cable, and in some embodiments, the ribbon cable may be a specially fabricated ribbon cable having specific connectors. The ribbon cable may include any number of different wires, depending on the IGU 900 and the window controller. For example, the ribbon cable may include up to 4, 8, 18, 24, or even more wires. Two wires may be used to connect a window controller to the bus bars of the electrochromic pane, and the further wires may be used to connect the window controller to sensors, for example, associated with the IGU 900. FIG. 9C depicts a rather simple window movement mechanism, i.e., rotating on an axis in order to open and close. There are more complicated movement mechanisms for which controllers described herein may control and for which more sophisticated wiring assemblies are configured. These are further described below.

Figure 9D:
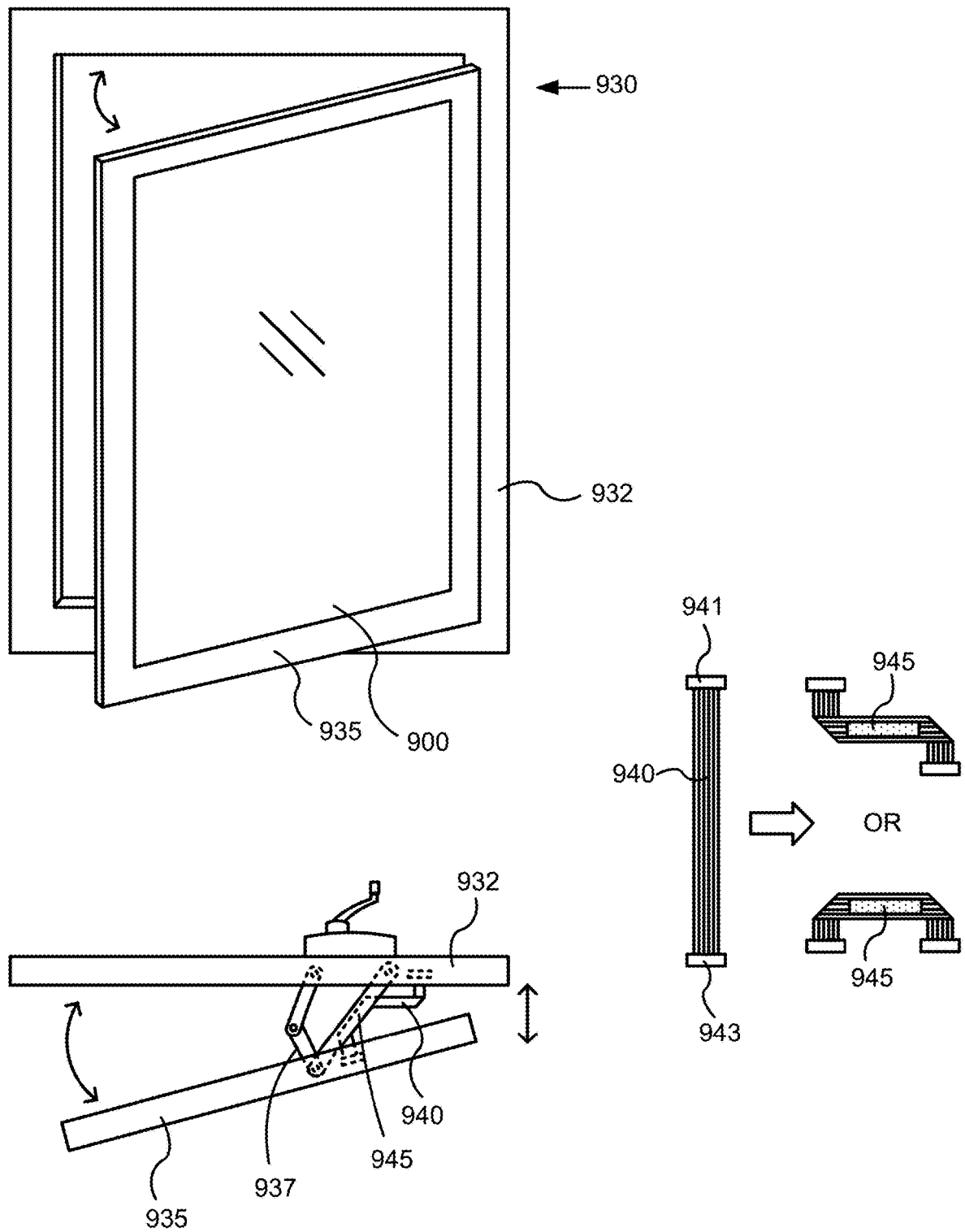

FIG. 9D shows schematic diagrams of a window unit, 930, incorporating an insulated glass unit, 900, including an electrochromic pane (not specifically depicted). Window unit 930 includes a frame, 932, in which a movable frame, 935, is mounted. Movable frame 935 is movably mounted in frame 932 so that it may rotate and translate via a movement mechanism, 937, from a closed position to an open position, for example. Mechanism 937 may include a number of arms that allow for this rotation and translation. In this example, movement mechanism 937 is a manually operated mechanism, but in other embodiments, the mechanism is driven electrically and, optionally, the controller that controls the transitions of IGU 900 also controls movement mechanism 937. The IGU 900's electrochromic pane is in electrical communication with a window controller through a ribbon cable, 940.

By virtue of its configuration, ribbon cable 940 allows for rotation and translation of movable frame 935, with respect to frame 932, without becoming entangled in mechanism 937 and also while being aesthetically unobtrusive (i.e. it is at least partially hidden to the user by mechanism 937). Ribbon cable 940 may include two connectors 941 and 943, similar to ribbon cable 905, for coupling the electrochromic pane in IGU 900 in movable frame 935 to a window controller, e.g. via wiring through frame 932. Again, many different types of connectors may be used for the ribbon cable. In some embodiments, ribbon cable 940 may be partially or fully attached to an arm or arms of mechanism 937. Ribbon cable 940 may be attached to an arm of movement mechanism 937 with an adhesive, 945, for example. Other ways of attaching the ribbon cable to a component of mechanism 937 are possible, however, including brackets, clips and Velcro, for example. As shown, ribbon cable 940 may include one or more folds such that it conforms to accommodate the configuration of mechanism 937. For example, ribbon cable 940 may include one or more folds, as shown in FIG. 9D, right-most portion. Ribbon cable is well suited for such applications because it is relatively flat and can be folded without breaking the wires within the ribbon.

A ribbon cable similar to the ribbon cable 905 or 940 also may be used for a window unit including a movable frame that translates, specifically a sliding window. The window unit may include a frame in which a movable frame is mounted. The movable frame may include an insulated glass unit including an electrochromic pane. The movable frame may be movably mounted in the frame so that it may translate. A ribbon cable may allow for translation of the movable frame with respect to the frame.

As described above, where a connector is configured within an IGU may be important when considering where to attach wiring connectors to the IGU. Flexibility in attaching wiring assemblies to an IGU can significantly reduce wiring complexity and length, and thus save considerable time and money, both for fabricators and installers. One embodiment is an electrical connection system including a track, the track including two or more rails that provide electrical communication, via wiring and bus bars, to the electrodes of an EC device of the IGU. The track is, e.g., embedded in the secondary sealing area of the IGU. An associated connector engages the rails and thereby makes electrical connection to the rails. A non-limiting example of the track described above is described in relation to FIGS. 10A and 10B.

Figure 10A:
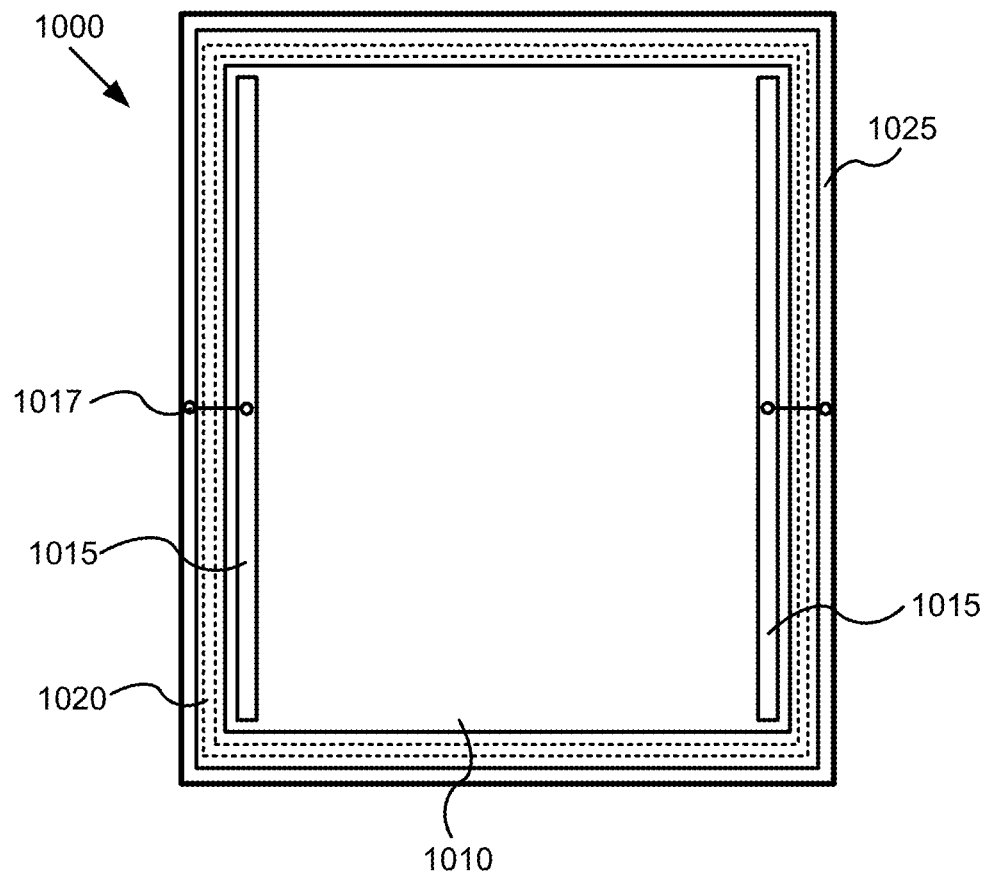
FIGS. 10A and 10B include schematic diagrams of an insulated glass unit (IGU) with a frame that may serve as both as a secondary sealing element and an electrical connector for an electrochromic pane of the IGU.
Figure 10B:
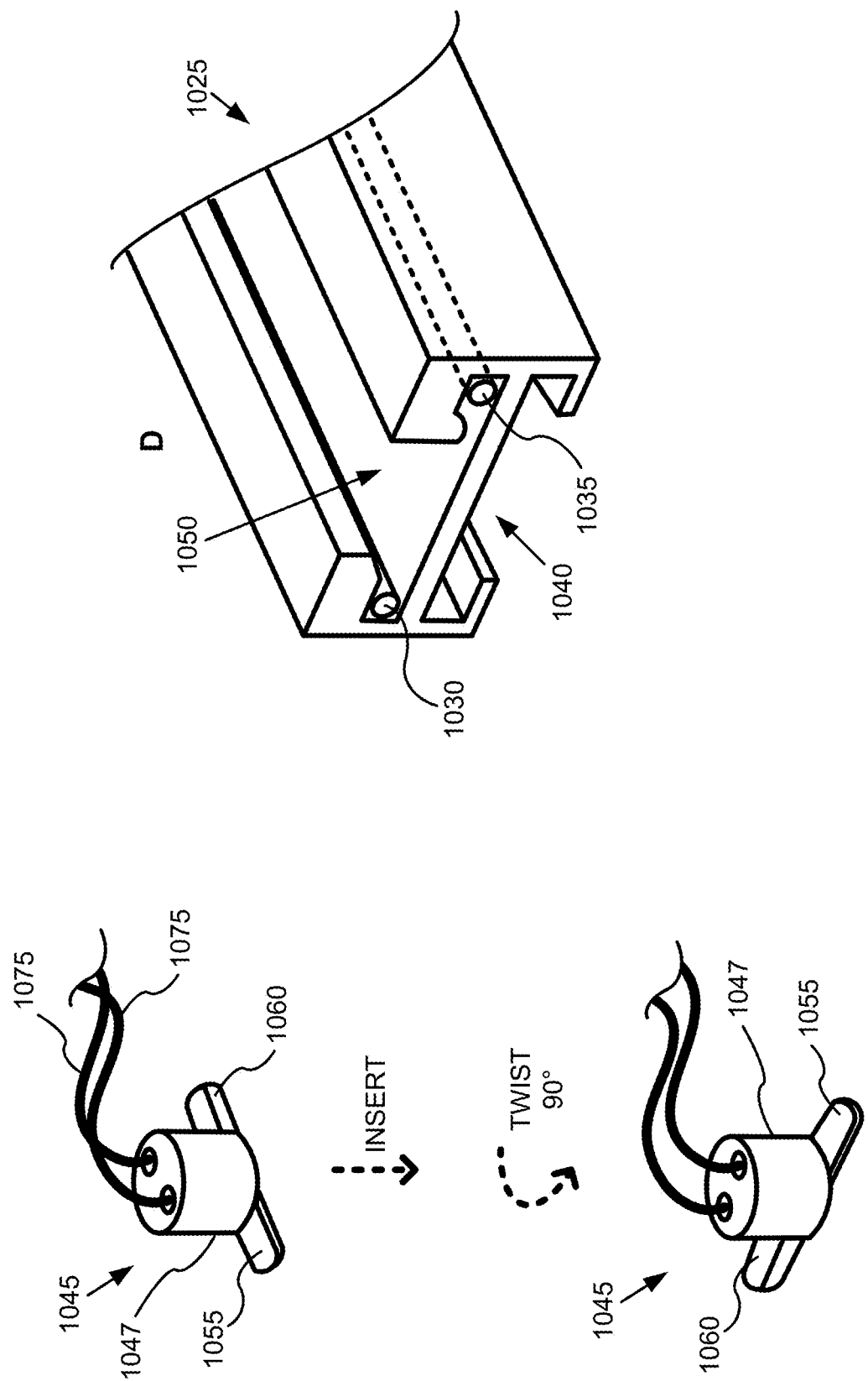

FIGS. 10A and 10B depict aspects of an insulated glass unit, 1000, including a track, 1025, and an associated connector, 1045. In this example, track 1025 is also a spacer that may serve as both a secondary sealing element and an electrical connector for an electrochromic pane of the IGU, although the sealing function is not necessary. FIG. 10A is a schematic diagram of IGU 1000 including an electrochromic pane, 1010. Electrochromic pane 1010 includes bus bars, 1015. Electrochromic pane 1010 is matched with another pane (not shown) and together the panes sandwich a separator, 1020, with a primary seal being formed between separator 1020 and the inside surfaces of the panes along with an adhesive. In this example, track 1025 is used to form a secondary seal, similar to the primary seal formed between the glass panes and separator 1020, with an adhesive between the inner surfaces of the glass panes and track 1025. Thus, in this example, the primary and secondary seals are formed in the same fashion. Track 1025 adds additional rigidity and strength to the IGU structure as well as a sealing function. In certain embodiments, the track is embedded in a traditional secondary sealant without also serving as a sealing element itself; in these embodiments, the track needs to traverse the entire perimeter of the IGU.

Track 1025 also includes rails, in this example in the form of wires, 1030 and 1035, which provide electrical communication to bus bars 1015 via wires, 1017. That is, wires 1017 connect bus bars 1015 to wires 1030 and 1035 in track 1025. Track 1025 is described further in relation to FIG. 10B. FIG. 10A, in the bottom portion, shows only track 1025. Included is an expanded view of a corner portion of track 1025, showing detail of a channel in which reside wires 1030 and 1035. In this example, wires 1030 and 1035 run all the way around the channel of track 1025. In other embodiments, wires 1030 and 1035 run only in a portion (e.g., one side, two sides, or three sides) of track 1025. The rails of the track may be other than wires, so long as they are conductive material, although wires are convenient because they are common and easily configured in a track, e.g., track 1025 may be an extruded plastic material into which wires may be molded, or the wires may be inserted into the track after extrusion or molding.

FIG. 10B shows a cross-section D, as indicated in FIG. 10A, of track 1025 showing the details of wires 1030 and 1035 and finer detail of track 1025. Track 1025 may be a non-conducting material, such as an extruded polymer, for example, that holds wires 1030 and 1035 in place. In one example, track 1025 is made of an extruded plastic channeled material. The channeled material is cut and formed, e.g., ultrasonically welded, to form a unitary body as depicted. As shown in FIG. 10B, wires 1030 and 1035 are located within recesses in track 1025 and, in this example, each wire is insulated on three sides. As mentioned, the wires may be inserted into the recesses after the track is fabricated. Track 1025 includes two slots or channels, 1040 and 1050. Slot 1050 allows for electrical connection of an electrical connector, e.g., from a window controller to IGU 1000. Wires 1017 from bus bars 1015 of the electrochromic pane 1010 may be housed in slot 1040. Wires 1017 may pass though the material of track 1025, e.g., passing from slot 1040 through an aperture and into slot 1050, so that the each of the wires 1017 may contact its respective wire 1030 or 1035. The aperture through which wires 1017 pass may be sealed prior to fabrication of the IGU, or during fabrication of the IGU, e.g., using adhesive sealant residing in slot 1040. In one example, a sealant is applied to the gap between the wire and the aperture. Slot 1040 also may allow for additional wires and/or interconnections to be made to the IGU.

In one example, track 1025 is assembled with wires 1017 being attached to rails 1030 and 1035 prior to being attached to bus bars 1015. That is, one embodiment is a track including rails and wires connected to the rails, the wires passing through the track such that the track, once sandwiched between two panes of glass, optionally with an adhesive sealant, forms a hermetic seal. In one such embodiment, assembly of the IGU includes 1) attaching wires 1017 to the bus bars, and 2) then simultaneously forming the primary and the secondary seal using separator 1020 and track 1025. Electrical connections may be made to electrochromic pane 1010 with connector 1045. Connector 1045 may include a non-conducting body 1047 with two conducting tabs, 1055 and 1060. In this example, each of the two conducting tabs 1055 and 1060 is connected to a single incoming wire, 1075. Each of the single wires may be coupled to a connector, as described herein, and ultimately connected to a window controller. In this example, to establish electrical connection, connector 1045 is inserted into slot 1050 and then twisted about 90 degrees so that each of the conducting tabs, 1055 and 1060, makes contact with a wire, 1035 and 1030, respectively. In some embodiments, to ensure that a correct wire is in contact with the correct tab, tabs 1055 and 1060 and the recesses housing wires 1030 and 1035 are asymmetrical. As shown in FIG. 10B, tab 1060 is thicker than tab 1055. Further, the recess housing wire 1030 is smaller than the recess housing wire 1035. Connector 1045 enters slot 1050 and then, by virtue of the configuration of the recesses and tabs, the connector can be turned only so that tab 1060 contacts wire 1030 and tab 1055 contacts wire 1035. Varying tab thickness and recess size is one way to help to insure that the connector 1045 is in contact with the correct wires, but other mechanisms to achieve this are also possible.

One of ordinary skill in the art would appreciate that other configurations of track 1025 are possible. For example, in one embodiment, track 1025 is a linear track that is inserted along one side of the IGU in the secondary sealing area. Depending upon the need, one, two, three or four such linear tracks, each along an independent side of the IGU, are installed in the IGU. In another embodiment, track 1025 is U-shaped, so that when installed in the secondary sealing area of the IGU, it allows electrical connection via at least three sides of the IGU.

Although the foregoing embodiments have been described in some detail to facilitate understanding, the described embodiments are to be considered illustrative and not limiting. It will be apparent to one of ordinary skill in the art that certain changes and modifications can be practiced within the scope of the appended claims.

What is claimed is:

1. A window unit comprising:
   an insulated glass unit including an optically switchable pane;
   a wire assembly attached to an edge of the insulated glass unit and comprising wires in electrical communication with distinct electrodes of the optically switchable pane; and
   a first connector embedded in a secondary seal of the insulated glass unit, the first connector electrically coupled to the wires in electrical communication with the optically switchable pane, and wherein the first connector comprises a terminal face presenting two exposed contacts of opposite polarities.

2. The window unit of claim 1, wherein the optically switchable pane includes an electrochromic device.

3. The window unit of claim 2, wherein the electrochromic device is solid state and inorganic.

4. The window unit of claim 1, further comprising a first frame in which the insulated glass unit is mounted.

5. The window unit of claim 4, further comprising a second frame, wherein the first frame is fixedly mounted in the second frame, wherein a fixed connector is affixed to the second frame, and wherein the first connector and the fixed connector are configured to contact one another when the first frame is fixedly mounted in the second frame, the fixed connector comprising mating contacts configured to supply electrical charge to the two exposed contacts of the first connector.

6. The window unit of claim 4, further comprising a second frame, wherein the first frame is moveably mounted in the second frame, wherein a fixed connector is affixed to the second frame, and wherein the first connector and the fixed connector are configured to contact one another when the first frame is at a first position in the second frame, the fixed connector comprising mating contacts configured to supply electrical charge to the two exposed contacts of the first connector.

7. The window unit of claim 6, wherein the fixed connector is coupled to a window controller, the window controller being configured to transition the optically switchable pane between a first optical state and a second optical state.

8. The window unit of claim 6, wherein two holes are in a body of the fixed connector for affixing the fixed connector to the second frame, the two holes configured to allow the fixed connector to translate orthogonally to the motion of the first frame in order to align with the first connector when the first frame is at the first position in the second frame.

9. The window unit of claim 1, wherein the terminal face of the first connector is configured to facilitate mating with a fixed connector having a mating surface.

10. The window unit of claim 9, wherein the mating surface of the fixed connector presents mating contacts to supply electrical charge to the two exposed contacts of the first connector, wherein a mechanical device causes the mating contacts to extend from the mating surface, and wherein the mechanical device is configured to allow the mating contacts to recede into the fixed connector when a force is applied to the mating contacts.

11. The window unit of claim 9, wherein the mating surface of the fixed connector presents mating contacts to supply electrical charge to the two exposed contacts of the first connector, wherein a magnetic force causes the mating contacts to engage with the two exposed contacts when the mating surface is proximate the terminal face.

12. The window unit of claim 11, wherein the magnetic force is provided by the two exposed contacts in the first connector comprising one or more magnets and/or by the mating contacts comprising one or more magnets.

13. The window unit of claim 1, further comprising a second connector configured to electrically connect to the first connector, wherein the second connector includes at least one of (i) a memory device, (ii) an integrated circuit device, and (iii) a memory device and an integrated circuit device.

14. The window unit of claim 13, wherein the memory device and/or integrated circuit device stores information for identifying and/or controlling the optically switchable pane.

15. The window unit of claim 14, wherein the information comprises current and voltage operating instructions for transitioning the optically switchable pane between a first optical state and a second optical state.

16. The window unit of claim 14, wherein the information comprises a maximum electric signal and a minimum electric signal configured for application to the optically switchable pane by a window controller. mating surface.

17. The window unit of claim 1, wherein the first connector further comprises one or more protrusions emanating from a surface other than the terminal face, the one or more protrusions configured to engage with and hold a portion of the first connector to a first frame in which the insulated glass unit is to be mounted when the portion is passed through an aperture in the first frame.

18. The window unit of claim 16, wherein the one or more protrusions are incompressible to engage with and deform an inside of the aperture when the portion is passed there through.

19. The window unit of claim 16, wherein the one or more protrusions are compressible to compressively engage with an inside of the aperture when the portion is passed there through.

\* \* \* \* \*